(12) United States Patent
Zarakas et al.

(10) Patent No.: US 12,079,812 B2
(45) Date of Patent: Sep. 3, 2024

(54) UTILIZING MACHINE LEARNING AND TRUSTED TRANSACTION CARD LOCATIONS TO GENERATE A GEOGRAPHICAL MAP OF THE TRUSTED TRANSACTION CARDS

(71) Applicant: Capital One Services, LLC, McLean, VA (US)

(72) Inventors: James Zarakas, Centreville, VA (US); Adam Vukich, Alexandria, VA (US); Molly Johnson, Alexandria, VA (US)

(73) Assignee: Capital One Services, LLC, McLean, VA (US)

( * ) Notice: Subject to any disclaimer, the term of this patent is extended or adjusted under 35 U.S.C. 154(b) by 375 days.

(21) Appl. No.: 16/896,566

(22) Filed: Jun. 9, 2020

(65) Prior Publication Data

US 2021/0383394 A1 Dec. 9, 2021

(51) Int. Cl.
*G06Q 20/40* (2012.01)
*G06F 18/214* (2023.01)
(Continued)

(52) U.S. Cl.
CPC ....... *G06Q 20/4016* (2013.01); *G06F 18/214* (2023.01); *G06N 20/00* (2019.01); *G06Q 20/341* (2013.01); *G06Q 20/4015* (2020.05)

(58) Field of Classification Search
CPC .......... G06Q 20/4016; G06Q 20/4015; G06Q 20/341; G06N 20/00; G06F 18/214; G06K 9/6256
See application file for complete search history.

(56) References Cited

U.S. PATENT DOCUMENTS 10,872,345 B1 * 12/2020 Walters ................ G06Q 20/202
2006/0165060 A1 * 7/2006 Dua ....................... G06Q 20/42
705/76

(Continued)

OTHER PUBLICATIONS

A Fraud Detection System Using Machine Learning, IEEE (Year: 2021).*

(Continued)

*Primary Examiner* — Bruce I Ebersman
*Assistant Examiner* — Bhavin D Shah
(74) *Attorney, Agent, or Firm* — Harrity & Harrity, LLP

(57) ABSTRACT

A device may receive, from client devices of users, user data identifying the users, client device data identifying the client devices, and transaction card data identifying transaction cards, and may receive transaction account data identifying transaction accounts. The device may process the user data, the client device data, the transaction card data, and the transaction account data, with a machine learning model, to determine trust scores for the transaction cards, and may identify trusted transaction cards based on the trust scores. The device may receive, from trusted client devices associated with the trusted transaction cards, location data identifying locations of the trusted client devices and communication data indicating communications between the trusted transaction cards and the trusted client devices. The device may generate a card mapping for the trusted transaction cards based on the location data and the communication data, and may perform actions based on the card mapping.

20 Claims, 14 Drawing Sheets

(51) Int. Cl.
  *G06N 20/00* (2019.01)
  *G06Q 20/34* (2012.01)
  *H04L 9/40* (2022.01)

(56) References Cited

U.S. PATENT DOCUMENTS

2011/0078073 A1* 3/2011 Annappindi ........... G06Q 40/04
                                              705/38
2018/0308100 A1* 10/2018 Haukioja ............. G06Q 20/206
2019/0042976 A1*  2/2019 Tanglertsampan ..... G06N 20/00
2019/0378050 A1* 12/2019 Edkin .................... G06N 20/20

OTHER PUBLICATIONS

Anti-fraud system on the basis of data mining technologies, IEEE (Year: 2017).*

* cited by examiner

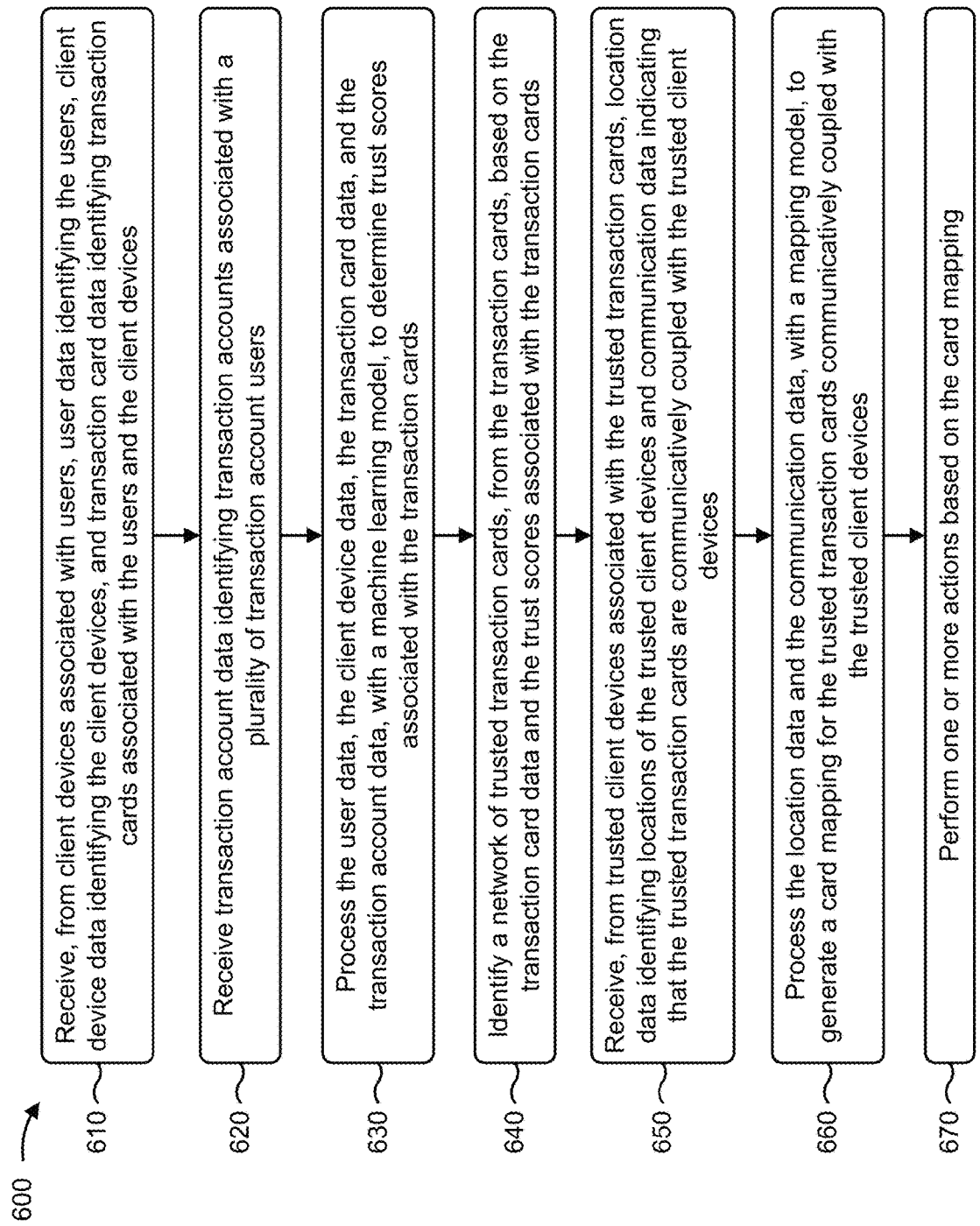

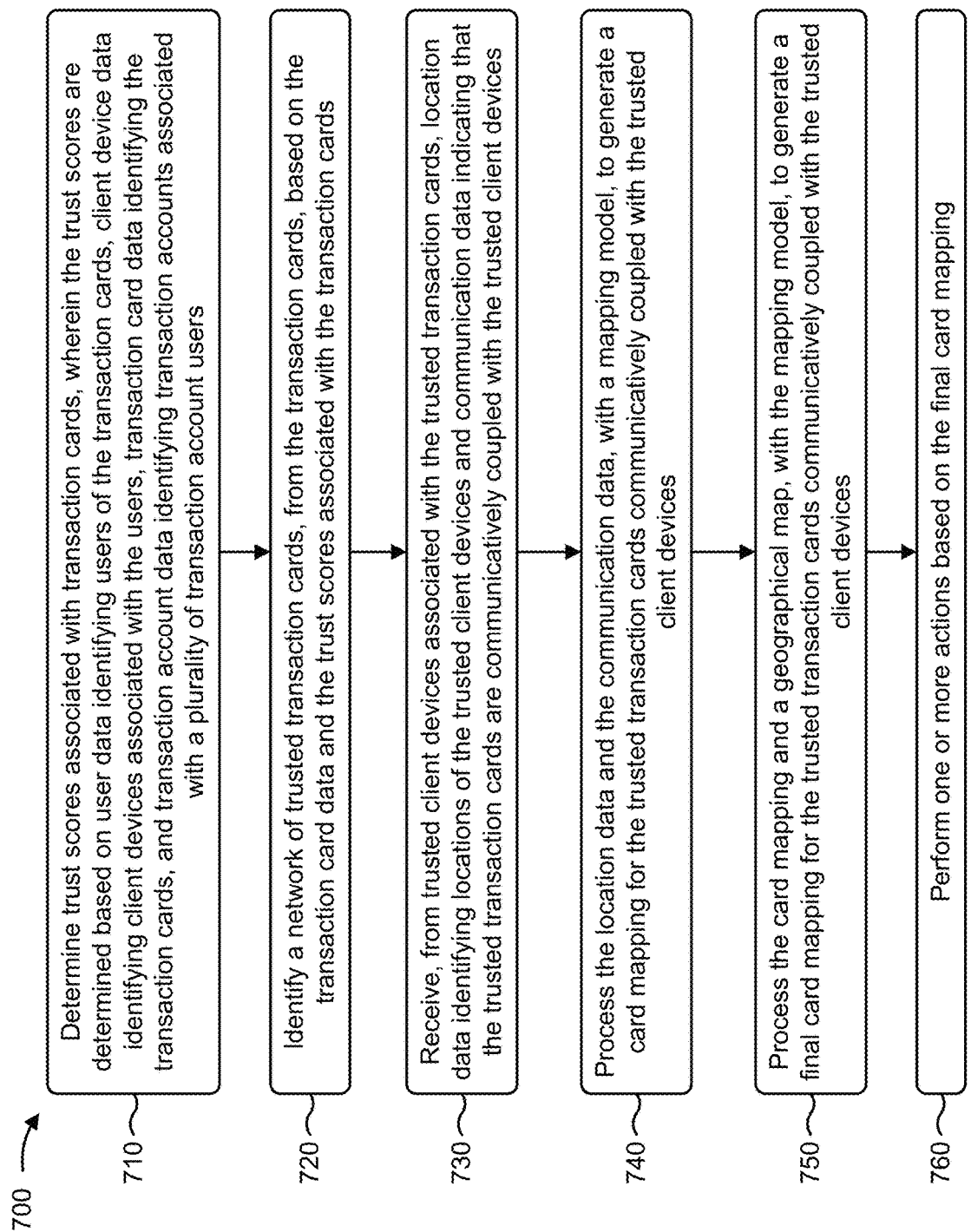

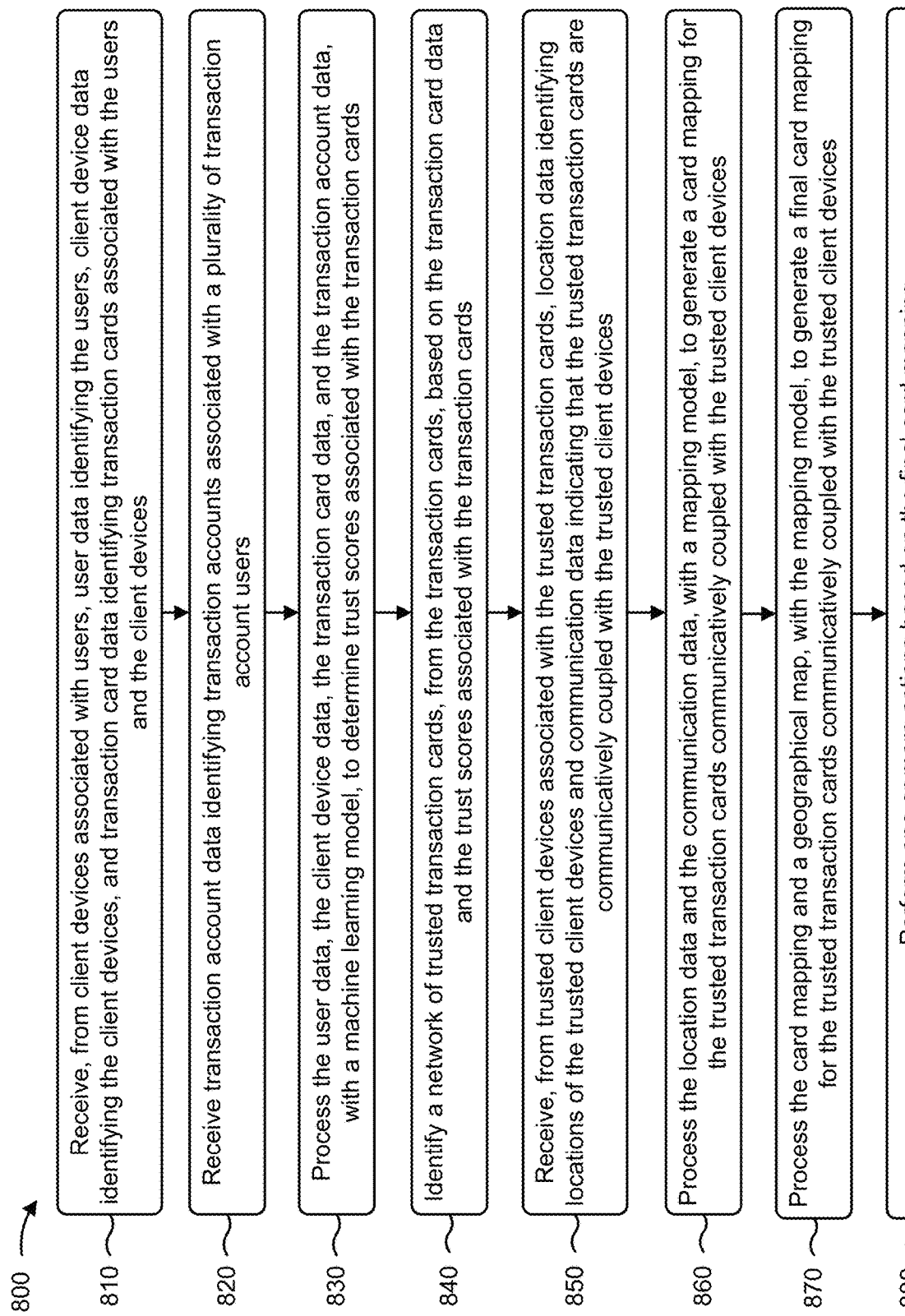

UTILIZING MACHINE LEARNING AND TRUSTED TRANSACTION CARD LOCATIONS TO GENERATE A GEOGRAPHICAL MAP OF THE TRUSTED TRANSACTION CARDS

BACKGROUND

A transaction made between two or more devices over a network may be protected using a number of different types of protocols, encryption techniques, and/or the like. For example, the transaction may be protected using a secure socket layer (SSL) protocol and/or another type of protocol.

SUMMARY

According to some implementations, a method may include receiving, from client devices associated with users, user data identifying the users, client device data identifying the client devices, and transaction card data identifying transaction cards associated with the users and the client devices, and receiving transaction account data identifying transaction accounts associated with a plurality of transaction account users. The method may include processing the user data, the client device data, the transaction card data, and the transaction account data, with a machine learning model, to determine trust scores associated with the transaction cards, and identifying a network of trusted transaction cards, from the transaction cards, based on the transaction card data and the trust scores associated with the transaction cards. The method may include receiving, from trusted client devices associated with the trusted transaction cards, location data identifying locations of the trusted client devices and communication data indicating that the trusted transaction cards are communicatively coupled with the trusted client devices. The method may include processing the location data and the communication data, with a mapping model, to generate a card mapping for the trusted transaction cards communicatively coupled with the trusted client devices, and performing one or more actions based on the card mapping.

According to some implementations, a device may include one or more memories, and one or more processors to determine trust scores associated with transaction cards, wherein the trust scores may be determined based on user data identifying users of the transaction cards, client device data identifying client devices associated with the users, transaction card data identifying the transaction cards, and transaction account data identifying transaction accounts associated with a plurality of transaction account users. The one or more processors may identify a network of trusted transaction cards, from the transaction cards, based on the transaction card data and the trust scores associated with the transaction cards, and may receive, from trusted client devices associated with the trusted transaction cards, location data identifying locations of the trusted client devices and communication data indicating that the trusted transaction cards are communicatively coupled with the trusted client devices. The one or more processors may process the location data and the communication data, with a mapping model, to generate a card mapping for the trusted transaction cards communicatively coupled with the trusted client devices, and may process the card mapping and a geographical map, with the mapping model, to generate a final card mapping for the trusted transaction cards communicatively coupled with the trusted client devices. The one or more processors may perform one or more actions based on the final card mapping.

According to some implementations, a non-transitory computer-readable medium may store one or more instructions that, when executed by one or more processors of a device, may cause the one or more processors to receive, from client devices associated with users, user data identifying the users, client device data identifying the client devices, and transaction card data identifying transaction cards associated with the users and the client devices, and receive transaction account data identifying transaction accounts associated with a plurality of transaction account users. The one or more instructions may cause the one or more processors to process the user data, the client device data, the transaction card data, and the transaction account data, with a machine learning model, to determine trust scores associated with the transaction cards, and identify a network of trusted transaction cards, from the transaction cards, based on the transaction card data and the trust scores associated with the transaction cards. The one or more instructions may cause the one or more processors to receive, from trusted client devices associated with the trusted transaction cards, location data identifying locations of the trusted client devices and communication data indicating that the trusted transaction cards are communicatively coupled with the trusted client devices, and process the location data and the communication data, with a mapping model, to generate a card mapping for the trusted transaction cards communicatively coupled with the trusted client devices. The one or more instructions may cause the one or more processors to process the card mapping and a geographical map, with the mapping model, to generate a final card mapping for the trusted transaction cards communicatively coupled with the trusted client devices, and perform one or more actions based on the final card mapping.

BRIEF DESCRIPTION OF THE DRAWINGS

FIGS. 6-8 are flow charts of example processes for utilizing machine learning and trusted transaction card locations to generate a geographical map of the trusted transaction cards.

DETAILED DESCRIPTION

Figure 1A:
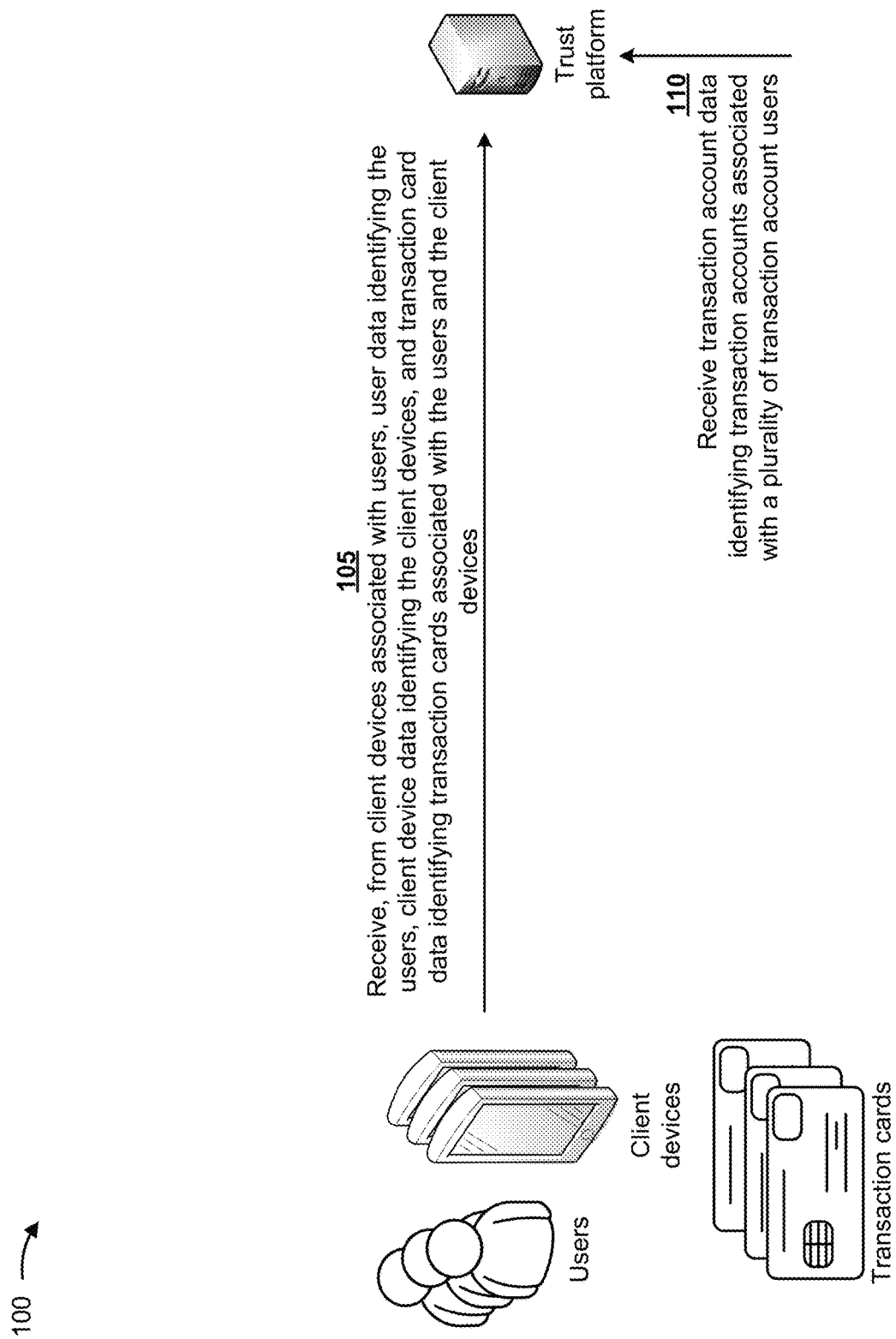
FIGS. 1A-1G are diagrams of one or more example implementations described herein.

The following detailed description of example implementations refers to the accompanying drawings. The same reference numbers in different drawings may identify the same or similar elements.

A merchant application (e.g., a web application, a mobile application, a desktop application, and/or the like) may, in some situations, allow users to engage in a transaction with each other, such as a transaction for a product and/or a service. For example, a first user may use a first device to post an offer via an interface of the merchant application and a second user may use a second device to access the interface and to accept the offer. In some cases, the merchant application may provide users with a certain degree of anonymity while engaging in transactions.

However, without a way to verify the credibility of users engaging in transactions, the anonymity provided by the merchant application may cause some users to engage in fraudulent transactions, such as by providing defective and/or fake products and/or services for sale, by accepting payment for products without intent to deliver those products, and/or the like. Furthermore, even if a user could be verified as being a credible user, the merchant application may be unable to verify that an individual who is logged into the merchant application is in fact the credible user. For example, an unauthorized user may log into the account and may engage in a fraudulent transaction using the account of the user that had been identified as being a credible user. Thus, current techniques may waste computing resources (e.g., processing resources, memory resources, communication resources, and/or the like), networking resources, and/or the like associated with performing fraudulent transactions, assisting users that have been victimized by fraudulent transactions, correcting fraudulent transactions, investigating fraudulent transactions, and/or the like.

Some implementations described herein provide a trust platform that utilizes machine learning and trusted transaction card locations to generate a geographical map of the trusted transaction cards. For example, the trust platform may receive, from client devices associated with users, user data identifying the users, client device data identifying the client devices, and transaction card data identifying transaction cards associated with the users and the client devices, and may receive transaction account data identifying transaction accounts associated with a plurality of transaction account users. The trust platform may process the user data, the client device data, the transaction card data, and the transaction account data, with a machine learning model, to determine trust scores associated with the transaction cards, and may identify a network of trusted transaction cards, from the transaction cards, based on the transaction card data and the trust scores associated with the transaction cards. The trust platform may receive, from trusted client devices associated with the trusted transaction cards, location data identifying locations of the trusted client devices and communication data indicating that the trusted transaction cards are communicatively coupled with the trusted client devices. The trust platform may process the location data and the communication data, with a mapping model, to generate a card mapping for the trusted transaction cards communicatively coupled with the trusted client devices, and may perform one or more actions based on the card mapping.

In this way, the trust platform utilizes machine learning and trusted transaction card locations to generate a geographical map of the trusted transaction cards. The geographical map of the trusted transaction cards may provide an additional source of data that could enhance security and benefits associated with a network of trusted transaction cards. For example, the geographical map may enable a first trusted transaction card to be utilized to authenticate a user of a second trusted transaction card. This, in turn, conserves computing resources, networking resources, and/or the like that would otherwise have been wasted in performing fraudulent transactions, assisting users that have been victimized by fraudulent transactions, correcting fraudulent transactions, investigating fraudulent transactions, and/or the like.

Furthermore, the trust platform may enable an entity (e.g., a user, an organization, an institution, and/or the like) to determine a level of trustworthiness of a user, a client device associated with the user, a network associated with the user and/or the client device, and/or the like, and perform suitable or appropriate action(s) based on the determination. For example, in some implementations, the trust platform is capable of permitting a first client device, or a user associated with the first client device, to provide a trustworthiness score for a second client device, or a user associated with the second client device, that is indicative of a level of trustworthiness of the second client device or the user associated with the second client device (e.g., based on the second client device's activities on a network provided by the first client device and/or the like). In some implementations, the trust platform is capable of permitting the first client device, or the user associated with the first client device, to blacklist the second client device or the user associated with the second client device (e.g., in a contact list stored in, or accessible to, the first client device), and/or to suggest that the second client device, or the user associated with the second client device, be blacklisted in or by the trust platform. In some implementations, the trust platform is capable of determining a composite score—e.g., a composite trustworthiness score—for a user, or a client device associated with the user, based on crowdsourced input or feedback, such as various trustworthiness scores and/or blacklisting suggestions, provided by multiple users or client devices. In some implementations, the trust platform is capable of permitting users to provide a trustworthiness score for a network, such as a Wi-Fi hotspot network, a public Wi-Fi network, and/or the like, that is indicative of a level of trustworthiness, a level of safety, and/or the like of the network, and which may be used (e.g., by an entity, such as a financial institution) to determine how, or whether, to process requests submitted by client devices that are communicatively coupled to the network.

In this way, an entity may determine, based on a level of trustworthiness associated with a user, or an associated client device, whether the user, or the associated client device, is to be granted certain access rights—e.g., for accessing a network (e.g., a public Wi-Fi network), for communicatively coupling with the entity's device (e.g., over Bluetooth and/or the like), and/or the like, which permits the entity to screen users or client devices before granting such access, thereby improving network security and/or device security. This also reduces or eliminates a need for the entity to employ third-party network, or device, monitoring applications, which conserves costs, computing resources, and memory resources. In addition, an entity, such as a financial institution may determine, based on trustworthiness-based information received from multiple sources (including, for example, scores that are indicative of a level of trustworthiness associated with a user, the user's client device, and/or a network connection relating to the client device), whether the user, or the client device, is to be permitted to conduct a transaction (e.g., to conduct a purchase over the Internet, up to a certain dollar amount, and/or the like) and/or whether the user is to be granted a certain amount of credit (e.g., in connection with a request to apply for a credit-based account), which permits the entity to avoid processing transactions or extending credit limits over an unsafe connection, thereby controlling credit risk and improving the overall security of transactions.

FIGS. 1A-1G are diagrams of one or more example implementations 100 described herein. As shown in FIG. 1A, client devices may be associated with transaction cards and a trust platform. The client devices may include mobile devices, computers, and/or the like associated with users. The transaction cards may include credit cards, debit cards, rewards cards, prepaid cards, gift cards, payment cards, automated teller machine cards, stored-value cards, fleet cards, and/or the like associated with the users. Each of the transaction cards may store and communicate data with corresponding ones of the client devices. The trust platform may include a platform that utilizes machine learning and trusted transaction card locations to generate a geographical map of the trusted transaction cards, as described herein.

As further shown in FIG. 1A, and by reference number 105, the trust platform may receive, from client devices associated with users, user data identifying the users, client device data identifying the client devices, and transaction card data identifying transaction cards associated with the users and the client devices. The user data may include data identifying demographics, credit scores, credit lines, ages, locations, and/or the like associated with the users. The transaction card data may include data identifying transaction card numbers, types of transaction cards, credit lines for the transaction cards, credit scores, and/or the like.

As further shown in FIG. 1A, and by reference number 110, the trust platform may receive transaction account data identifying transaction accounts associated with a plurality of transaction account users. The transaction account data may include data identifying transaction account identifiers, types of transaction accounts, credit lines for the transaction accounts, credit scores, and/or the like associated with the users and/or the transaction cards.

In some implementations, the trust platform stores the user data, the client device data, the transaction card data, and/or the transaction account data a data structure (e.g., a database, a table, a list, and/or the like) associated with the trust platform. In practice, there may be hundreds, thousands, millions, and/or the like, of users, client devices, transaction cards, and transaction accounts that produce thousands, millions, billions, and/or the like, of data points provided in the user data, the client device data, the transaction card data, and/or the transaction account data. In this way, the trust platform may handle thousands, millions, billions, and/or the like, of data points within a period of time (e.g., daily, weekly, monthly), and thus may provide "big data" capability.

Figure 1B:
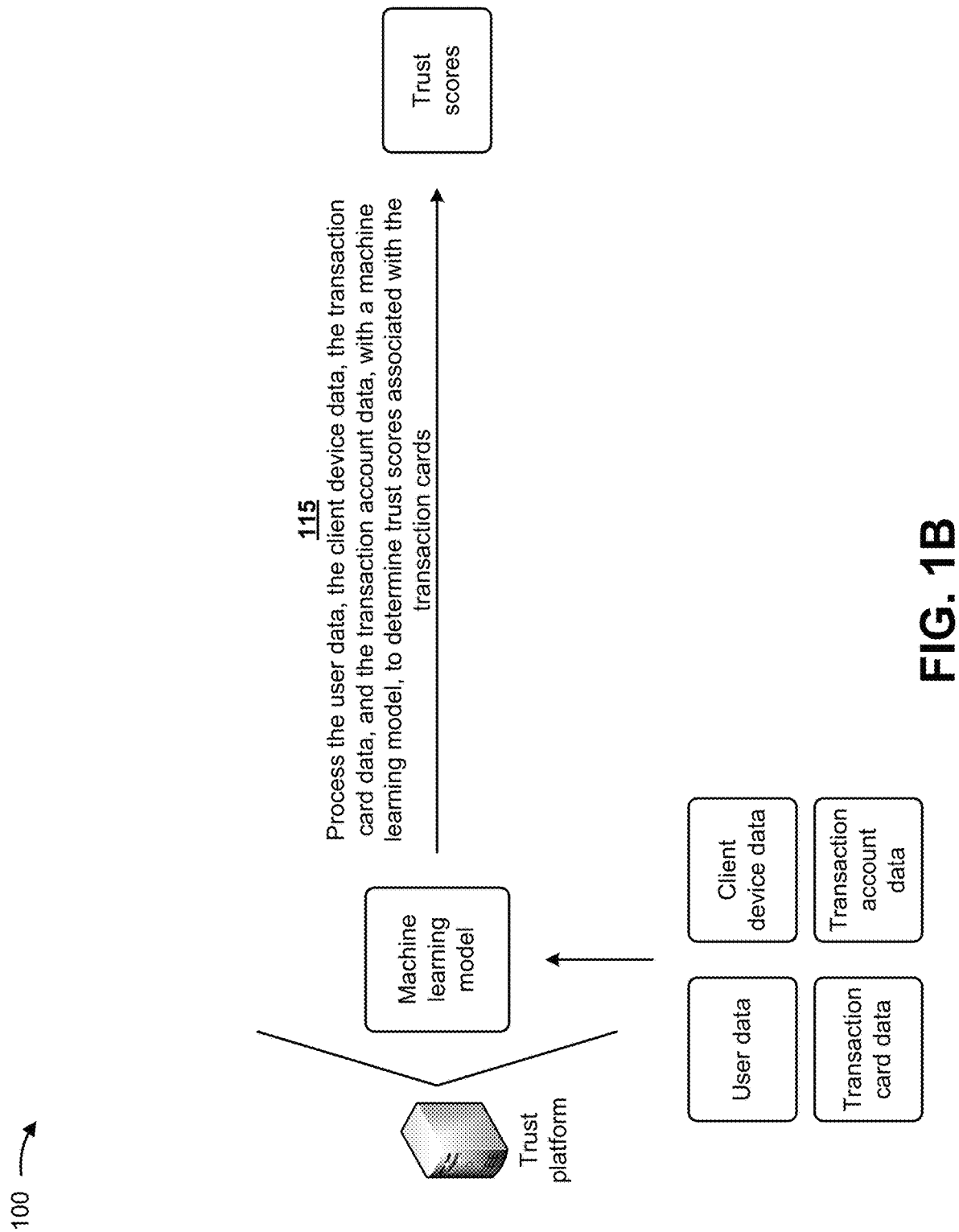

As shown in FIG. 1B, and by reference number 115, the trust platform may process the user data, the client device data, the transaction card data, and the transaction account data, with a machine learning model, to determine trust scores associated with the transaction cards. The machine learning model may include a linear classifier model, a nearest neighbor model, a support vector machine model, a decision tree model, a random forest model, a neural network model, and/or the like. A trust score may indicate a level of trustworthiness associated with a corresponding transaction card. For example, trust scores may fall into a range between 0.00 and 1.00, with trust scores of 1.00 representing a greatest trustworthiness and trust scores of 0.00 representing a least trustworthiness. Thus, a transaction card (e.g., a user associated with the transaction card) with a score of 0.95 would be considered more trustworthy than a transaction card (e.g., a user associated with the transaction card) with a score of 0.52.

The trust platform may continuously update the trust scores based on updated data received by the trust platform. For example, the trust platform may receive updated user data associated with a particular user of the users, updated client device data associated with a particular client device of the particular user, and/or updated transaction card data associated with a particular transaction card of the particular user, and may update a trust score associated with the particular transaction card based on the updated user, the updated client data, and/or the updated transaction card data.

The machine learning model may determine a trust score of a transaction card based on numerous feature values and relationships derived from the user data, the client device data, the transaction card data, and the transaction account data. For example, recognizable client device identifiers, strong credit scores, consistent transaction locations, transaction locations associated with a home or business of a user, and/or the like may increase a trust score, whereas unrecognized client device identifiers, weak credit scores, geographically disparate transactions within a short time period, and/or the like may decrease the trust score. Additionally, the machine learning model may determine a lower trust score based on inappropriate activities (e.g., online activities) associated with a user, a client device, a transaction card, and/or a transaction account, such as hacking, phishing, spamming, harassing of others, accessing illegal or inappropriate content, and/or the like.

The trust platform may train the machine learning model with historical data (e.g., historical user data, historical client device data, historical transaction card data, historical transaction account data, and/or the like) to generate a trained machine learning model. For example, the trust platform may train the machine learning model in a manner similar to the manner described below in connection with FIG. 2. In some implementations, rather than training the machine learning model, the trust platform obtains the machine learning model from another system or device that trained the machine learning model. In this case, the trust platform may provide the other system or device with historical data for use in training the machine learning model, and may provide the other system or device with updated historical data to retrain the machine learning model in order to update the machine learning model. When processing the user data, the client device data, the transaction card data, and the transaction account data, the trust platform may apply the machine learning model to a new observation in a manner similar to the manner described below in connection with FIG. 3.

Figure 1C:
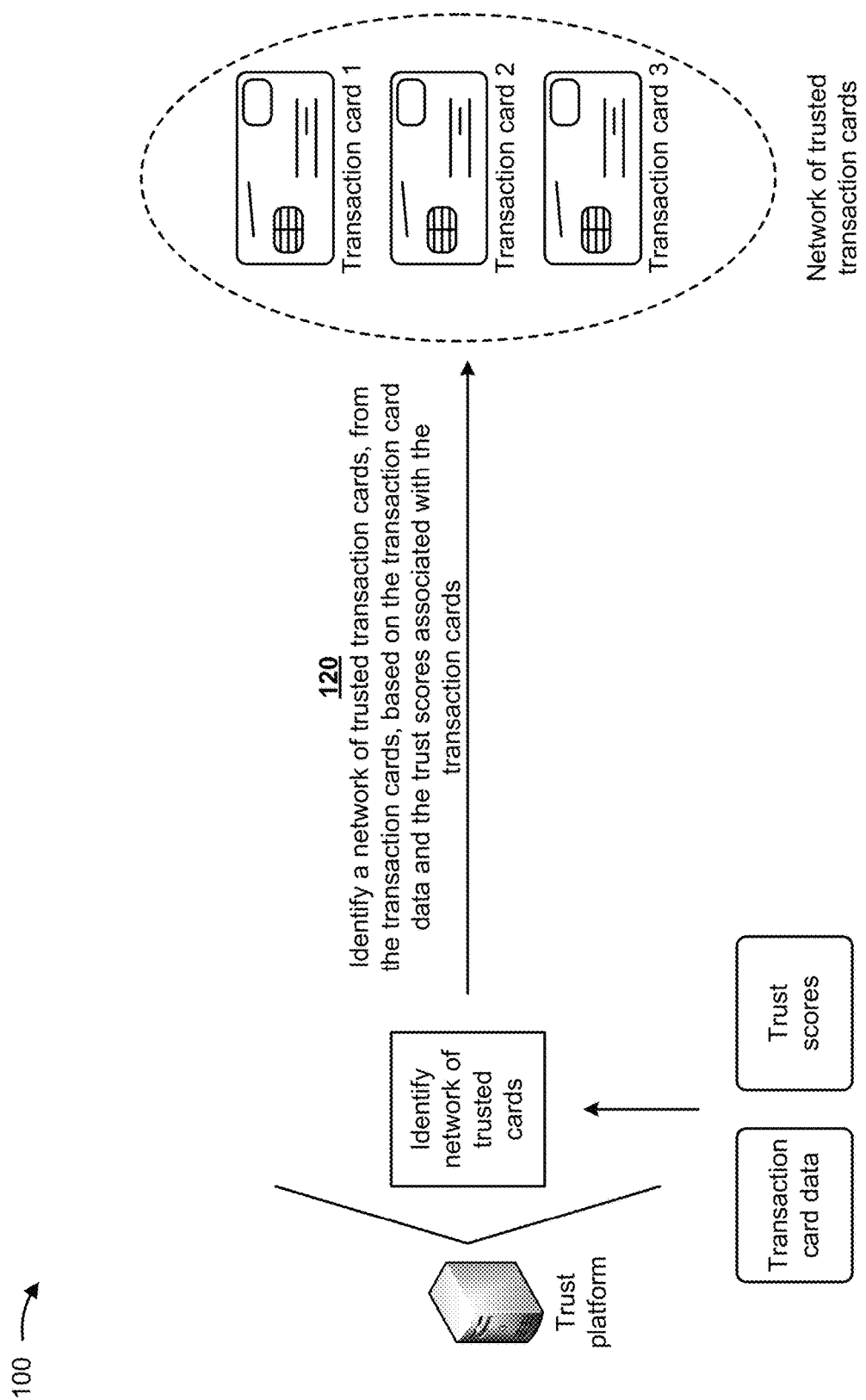

As shown in FIG. 1C, and by reference number 120, the trust platform may identify a network of trusted transaction cards, from the transaction cards shown in FIG. 1A, based on the transaction card data and the trust scores associated with the transaction cards. The trust platform may determine a transaction card to be a trusted transaction card when the trust score satisfies a threshold, and may include the trusted transaction card in the network of trusted transaction cards. For example, if the threshold is 0.75, the trust platform may determine that a transaction card having a trust score of 0.79 is a trusted transaction card, and may determine that a transaction card having a trust score of 0.71 is not a trusted transaction card. The trust platform may determine whether a transaction card is a trusted transaction card based on additional factors (e.g., a quantity of years the transaction card has been utilized by a user, frequency of use of the transaction card by the user, and/or the like), may adjust the trust score based on additional factors, and/or the like. Additionally, or alternatively, the trust platform may adjust the threshold based on circumstances such as external events (e.g., a data breach, increased reports of illegitimate activities, and/or the like). For example, the trust platform may identify the network of trusted transaction cards based on the transaction card data (e.g., card numbers, credit lines for the transaction cards, credit scores, and/or the like) of transaction cards determined to be trusted transaction cards.

Figure 1D:
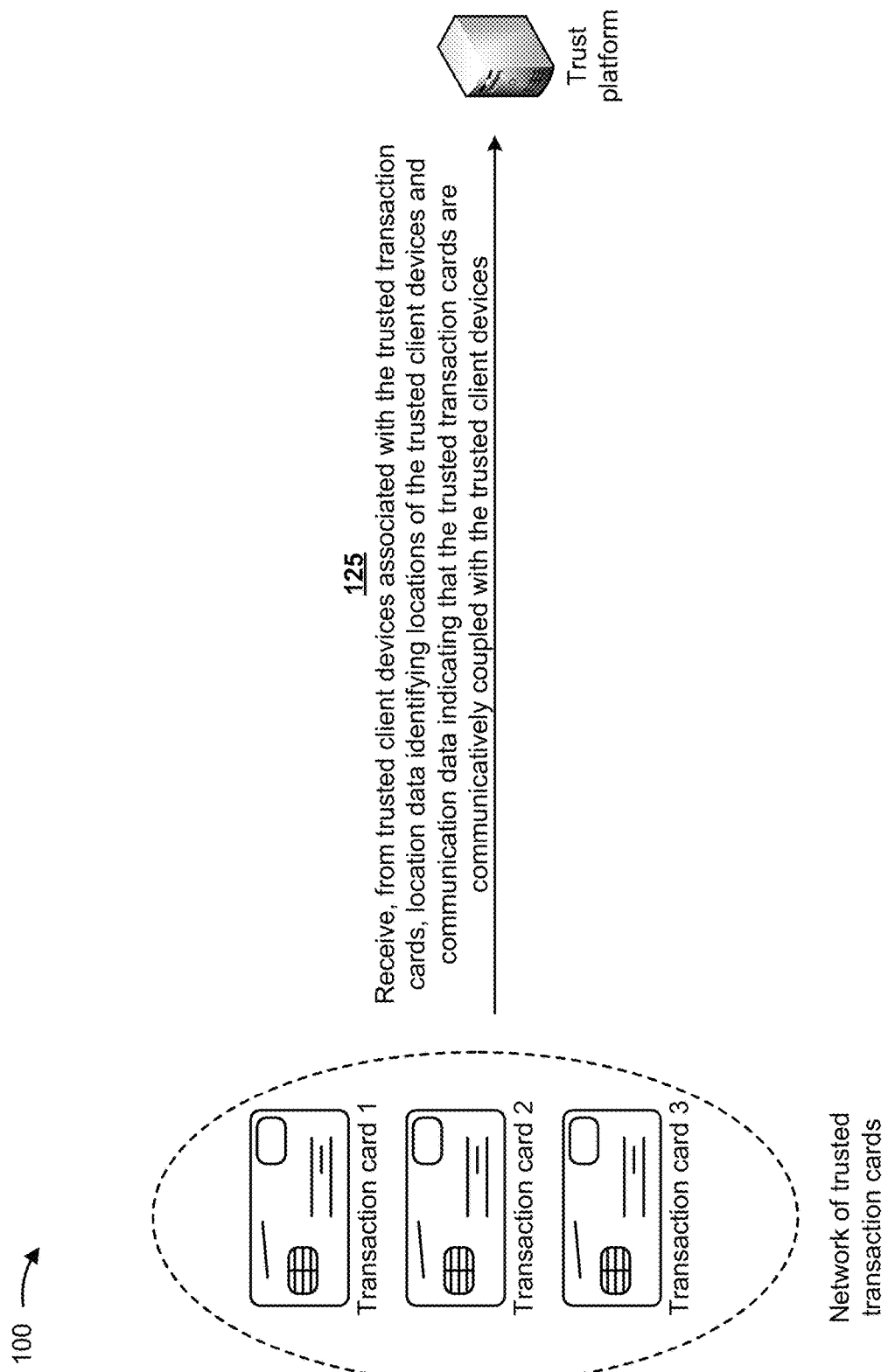

As shown in FIG. 1D, and by reference number 125, the trust platform may receive, from trusted client devices associated with the trusted transaction cards, location data identifying locations of the trusted client devices and communication data indicating that the trusted transaction cards are communicatively coupled with the trusted client devices. In some implementations, a client device associated with a trusted transaction is considered a trusted client device. The location data may include Global Navigation Satellite System (GNSS) data (e.g., global positioning system (GPS) data, global navigation satellite system (GLONASS) data, Galileo data, BeiDou (BDS) data, and/or the like) identifying the locations of the trusted client devices.

The communication data may indicate that a transaction card is communicatively coupled (e.g., via Bluetooth, Wi-Fi, and/or the like) with a trusted client device, such that the trust platform may confirm that a location of the trusted transaction card is proximate to a location of the client device, and location data associated with the trusted client device can be associated with the location of the trusted transaction card. This may provide an indication that the trusted transaction card is located with a user of the trusted client device, rather than at another location (e.g., at a home of the user when the user is at work). For example, since users may typically carry their wallets (e.g., with trusted transaction cards) and trusted client devices together, the communication data may confirm that the trusted transaction cards are proximate to the trusted client devices (e.g., in possession of the users).

Figure 1E:
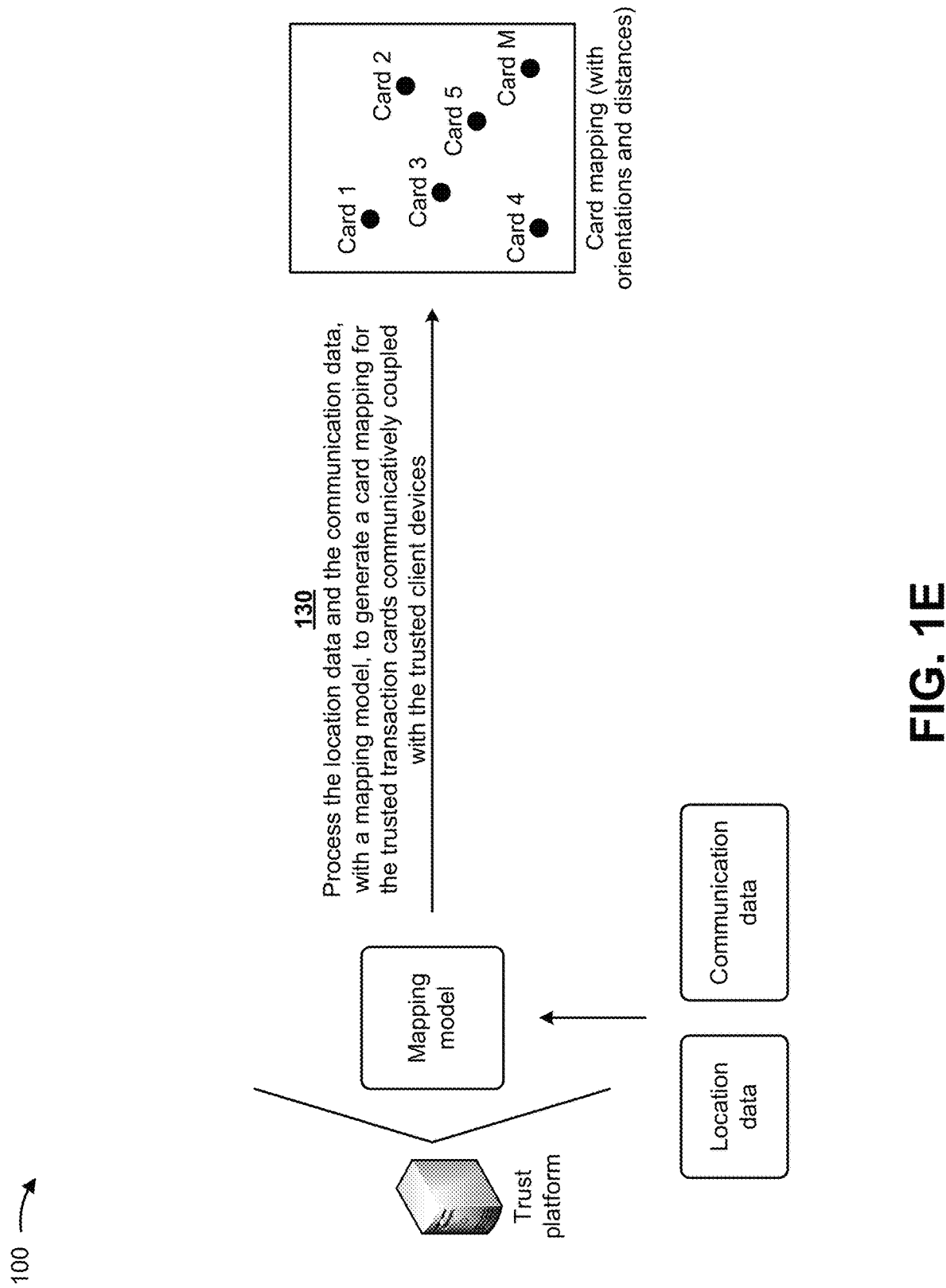

As shown in FIG. 1E, and by reference number 130, the trust platform may process the location data and the communication data, with a mapping model, to generate a card mapping for the trusted transaction cards communicatively coupled with the trusted client devices. In some implementations, the trust platform utilizes the card mapping to track, on an ongoing basis, a position and movement of each trusted transaction card that remains accessible by the trust platform. In this case, the trust platform may add newly accessible trusted transaction cards, transaction cards newly determined to be trusted, and/or the like to the card mapping, and/or may remove trusted transaction cards that are no longer accessible, transaction cards newly determined not to be trusted, and/or the like from the card mapping. The card mapping may include data identifying orientations of the trusted client devices (e.g., and corresponding trusted transaction cards), accelerations of the trusted client devices (e.g., and corresponding trusted transaction cards), distances between the trusted client devices (e.g., and corresponding trusted transaction cards), and/or the like. In some implementations, the card mapping represents the trusted transaction cards as nodes (e.g., of a mesh network). The trust platform may employ replication server system database identifier (RSSD ID) and mapping models to determine an orientation and distance of a node from other nodes.

The trust platform may train the mapping model with historical data (e.g., historical location data, historical communication data, and/or the like) to generate a trained mapping model. For example, the trust platform may train the mapping model in a manner similar to the manner described below in connection with FIG. 2. Rather than training the mapping model, the trust platform may obtain the mapping model from another system or device that trained the mapping model. In this case, the trust platform may provide the other system or device with historical data for use in training the mapping model, and may provide the other system or device with updated historical data to retrain the mapping model in order to update the mapping model. When processing the location data and the communication data, the trust platform may apply the mapping model to a new observation in a manner similar to the manner described below in connection with FIG. 3.

Figure 1F:
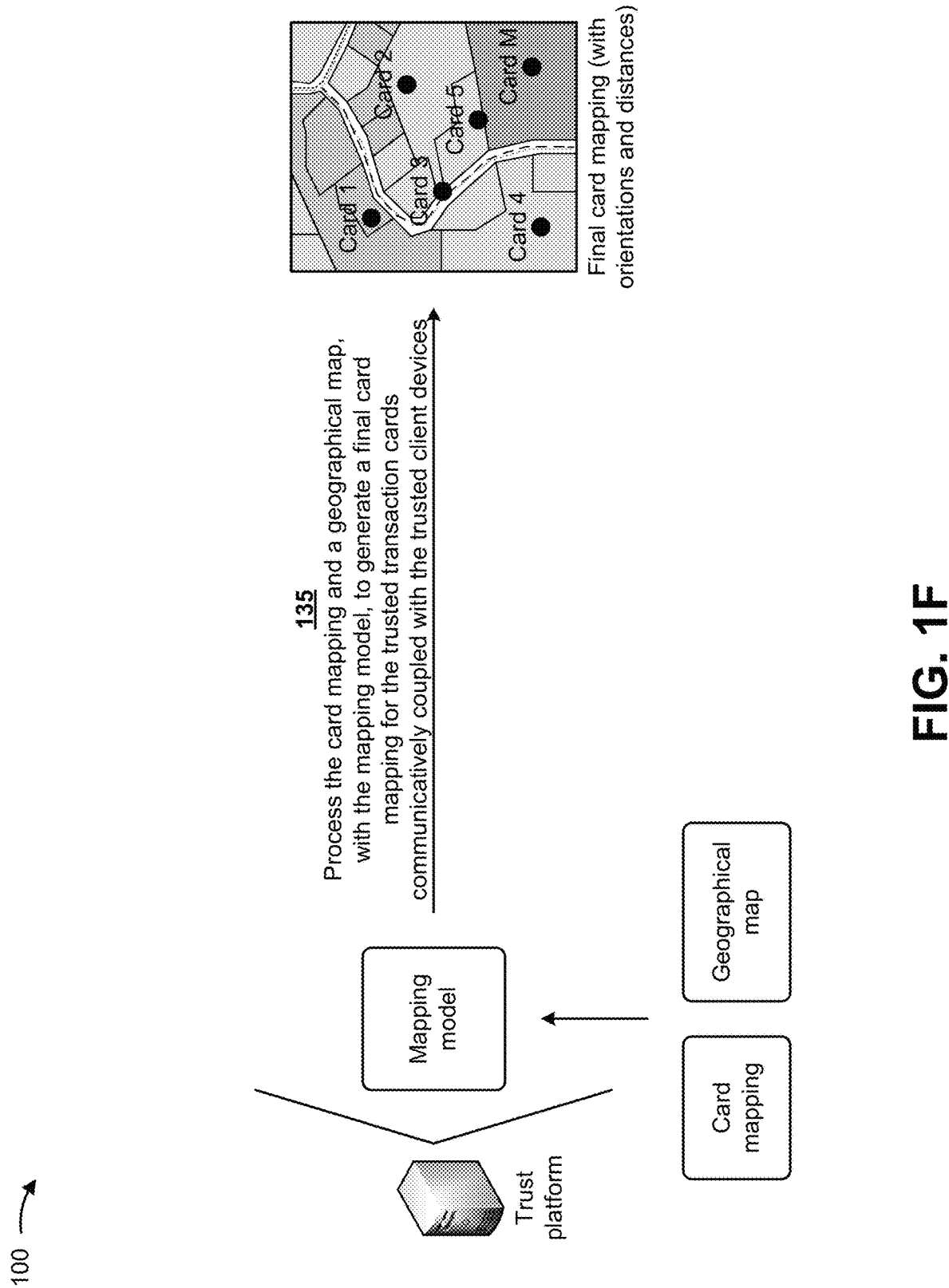

As shown in FIG. 1F, and by reference number 135, the trust platform may process the card mapping and a geographical map, with the mapping model, to generate a final card mapping for the trusted transaction cards communicatively coupled with the trusted client devices. For example, the mapping model may be the same as or similar to the mapping model described above with respect to FIG. 1E, may be associated with the mapping model described above with respect to FIG. 1E, may be included in or may include the mapping model described above with respect to FIG. 1E, and/or the like. The trust platform may overlay the card mapping on the geographical map to generate the final card mapping for the trusted transaction cards communicatively coupled with the trusted client devices. For example, the trust platform may associate location data corresponding to each node of the card mapping with positional data corresponding to a point on the geographical map, to overlay the card mapping on the geographical map. The geographical map of the trusted transaction cards may provide an additional source of data that could enhance security and benefits associated with the network of trusted transaction cards. For example, the geographical map may enable a first trusted transaction card to be utilized to authenticate a second trusted transaction card or a user of a second trusted transaction card.

The trust platform may continuously update the card mapping and/or the final card mapping based on updated data received by the trust platform. For example, the trust platform may receive, from one of the trusted client devices associated with one of the trusted transaction cards, updated location data indicating movement of the one of the trusted client devices, and may update the card mapping and/or the final card mapping based on the updated location indicating movement of the one of the trusted client devices. In another example, the trust platform may receive, from one of the trusted client devices associated with one of the trusted transaction cards, updated location data indicating that the one of the trusted client devices is no longer reachable by the remaining trusted client devices, and may update the card mapping and/or the final card mapping, based on the updated location, to remove the one of the trusted client devices from the card mapping and/or the final card mapping.

Figure 1G:
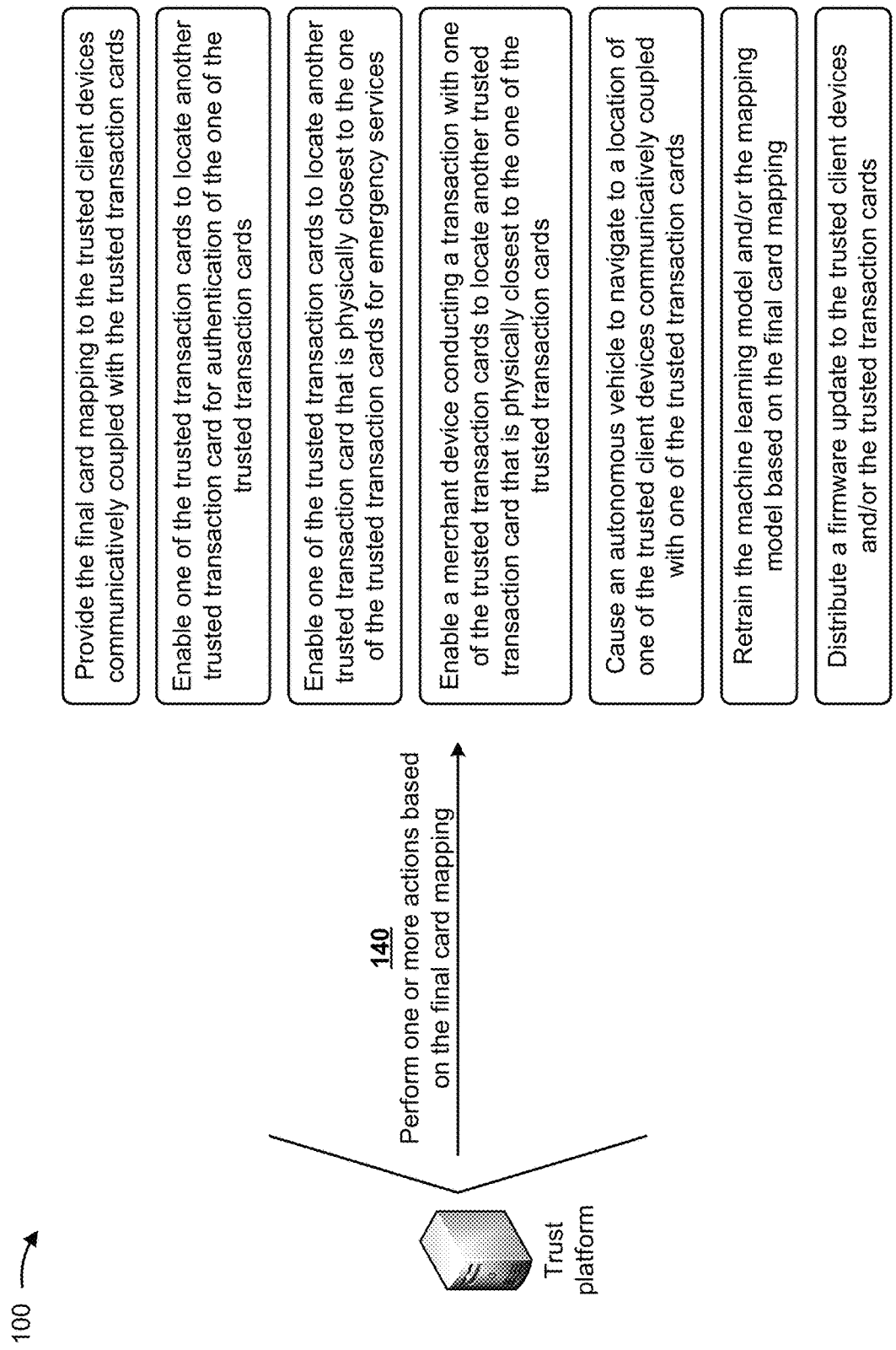

As shown in FIG. 1G, and by reference number 140, the trust platform may perform one or more actions based on the final card mapping. In some implementations, the one or more actions include the trust platform providing the final card mapping to the trusted client devices communicatively coupled with the trusted transaction cards. For example, the trust platform may provide the final card mapping as a user interface that may be displayed by the trusted client devices. In this way, the trust platform may enable a trusted client device, of the trusted client devices, to identify and communicate with another trusted client device within a communication distance of the trusted client device, which may provide the benefits of communicating with other trusted client devices (e.g., for transaction validation, user authentication, and/or the like), while providing security, by ensuring that the other client devices are trusted client devices. This, in turn, may improve efficiency and security of client device functions, thereby conserving computing resources (e.g., processing resources, memory resources, communication resources, and/or the like), networking resources, and/or the like.

In some implementations, the one or more actions include the trust platform enabling one of the trusted transaction cards to locate another trusted transaction card for authentication of the one of the trusted transaction cards. For example, the geographical map may enable a first trusted transaction card to be utilized to authenticate a user of a second trusted transaction card by a merchant located near the first trusted transaction card and the second trusted transaction card. In this way, the trust platform may conserve computing resources, networking resources, and/or the like that would otherwise have been wasted in performing fraudulent transactions, assisting users that have been victimized by fraudulent transactions, correcting fraudulent transactions, investigating fraudulent transactions, and/or the like.

In some implementations, the one or more actions include the trust platform enabling one of the trusted transaction cards to locate another trusted transaction card that is physically closest to the one of the trusted transaction cards for emergency service. For example, in the event of an emergency (e.g., at a location of the one of the trusted transaction cards), the trust platform may enable the one of the trusted transaction cards to locate the other trusted transaction card in order to provide location data (e.g., to emergency services during an emergency rescue) for a user of a trusted client device associated with the one of the trusted transaction cards. As another example, the trust platform may enable a first user of a first trusted client device associated with a first trusted transaction card to synchronize with a second user of a second trusted client device in order to communicate a message requesting help in the event of an emergency. Additionally, the second user may communicate with a third user, the third user may communicate with a fourth user, and/or the like. In this way, the trust platform may enable emergency services to be provided more quickly and efficiently, thereby potentially saving lives, protecting the health of users, and/or the like, as well as conserving resources that may otherwise have been associated with arranging for emergency services, treating more serious conditions resulting from delayed emergency services, and/or the like.

In some implementations, the one or more actions include the trust platform enabling a merchant device conducting a transaction with one of the trusted transaction cards to locate another trusted transaction card that is physically closest to the one of the trusted transaction cards. In this way, the trust platform may identify another trusted transaction card that is most appropriate to perform a function related to the transaction with the merchant device, which may conserve computing resources, networking resources, and/or the like that would otherwise have been required to determine an appropriate device, to rectify an inability to perform the function, and/or the like.

In some implementations, the one or more actions include the trust platform causing an autonomous vehicle to navigate to a location of one of the trusted client devices communicatively coupled with one of the trusted transaction cards. For example, the trust platform may cause the autonomous vehicle to navigate to the location when the one of the trusted transaction cards is used to purchase services associated with the autonomous vehicle, such as transportation services, delivery services, repair services, and/or the like. Additionally, or alternatively, the trust platform may cause the autonomous vehicle to navigate to the location when a system or device at the location (e.g., an automated teller machine (ATM), a point of sale (POS) terminal, and/or the like) requires supplies, repairs, and/or the like. In this way, the trust platform may conserve resources that would otherwise have been required to arrange for a vehicle to travel to the location of the one of the trusted client devices.

In some implementations, the one or more actions include the trust platform retraining the machine learning model and/or the mapping model based on the final card mapping. In this way, the trust platform may improve the accuracy of the machine learning model and/or the mapping model in processing the user data, the client device data, the transaction card data, and the transaction account data to determine trust scores associated with the transaction cards, processing the location data and the communication data to generate a card mapping for the trusted transaction cards communicatively coupled with the trusted client devices, processing the card mapping and a geographical map to generate a final card mapping for the trusted transaction cards communicatively coupled with the trusted client devices, and/or the like, which may improve speed and efficiency of the machine learning model and/or the mapping model and conserve computing resources, networking resources, and/or the like.

In some implementations, the one or more actions include the trust platform distributing a firmware update to one or more devices (e.g., one or more trusted client devices and/or one or more trusted transaction cards). For example, the trust platform may transmit the firmware update to a first set of devices (e.g., one or more trusted client devices and/or one or more trusted transaction cards), and the first set of devices may transmit the firmware update to another set of devices in communication with the first set of devices, and so on. In some implementations, the firmware update may be signed with a master key and/or a signature of a central authority (e.g., the trust platform). When a device receives the firmware update, the device may verify the master key and/or the signature prior to installing the firmware update. In some implementations, the device may install the firmware update separately from previously-installed firmware (rather than replacing the previously-installed firmware) to enable the firmware update to be undone. In this way, a firmware update may be distributed efficiently and without the need for a connection between a central authority and all of the trusted client devices and/or trusted transaction cards. Furthermore, devices may be kept up-to-date without requiring a direct connection to the central authority. Although implementations are described above in connection with a firmware update, these operations may be performed for another type of update, such as a software update.

In this way, several different stages of the process for generating a geographical map of trusted transaction cards are automated via machine learning and locations of the trusted transaction card, which may remove human subjectivity and waste from the process, and which may improve speed and efficiency of the process and conserve computing resources (e.g., processing resources, memory resources, communication resources, and/or the like), networking resources, and/or the like. Furthermore, implementations described herein use a rigorous, computerized process to perform tasks or roles that were not previously performed or were previously performed using subjective human intuition or input. For example, currently there does not exist a technique that utilizes machine learning and trusted transaction card locations to generate a geographical map of the trusted transaction cards in the manner described herein. Finally, the process for utilizing machine learning and trusted transaction card locations to generate a geographical map of the trusted transaction cards conserves computing resources, networking resources, and/or the like that would otherwise have been wasted in performing fraudulent transactions, assisting users that have been victimized by fraudulent transactions, correcting fraudulent transactions, investigating fraudulent transactions, and/or the like.

As indicated above, FIGS. 1A-1G are provided merely as examples. Other examples may differ from what is described with regard to FIGS. 1A-1G.

Figure 2:
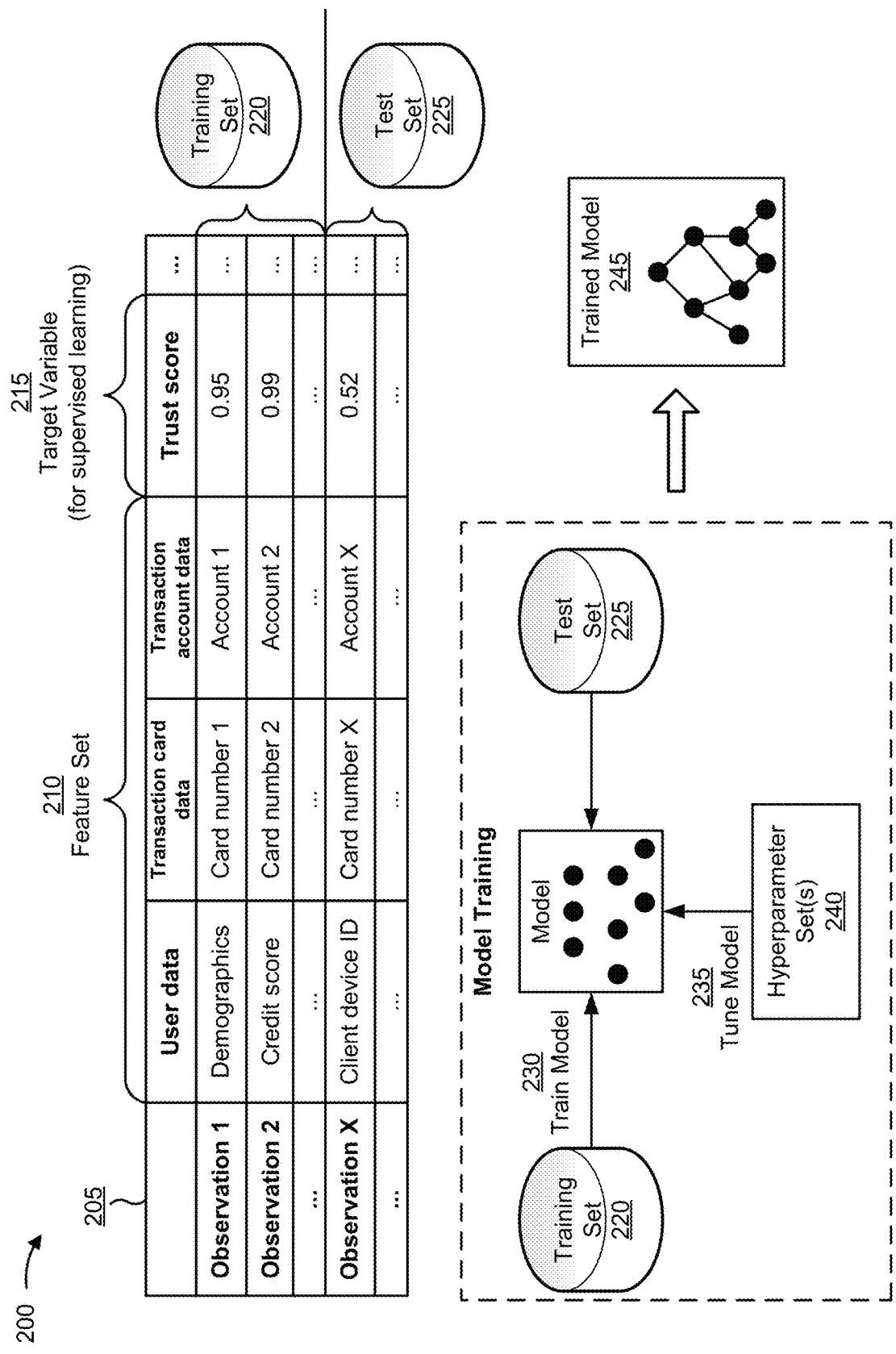
FIG. 2 is a diagram illustrating an example of training a machine learning model.

FIG. 2 is a diagram illustrating an example 200 of training a machine learning model. The machine learning model training described herein may be performed using a machine learning system. The machine learning system may include a computing device, a server, a cloud computing environment, and/or the like, such as the trust platform.

As shown by reference number 205, a machine learning model may be trained using a set of observations. The set of observations may be obtained and/or input from historical data, such as data gathered during one or more processes described herein. For example, the set of observations may include data gathered from user interaction with and/or user input to the client devices, as described elsewhere herein. In some implementations, the machine learning system receives the set of observations (e.g., as input) from the client devices.

As shown by reference number 210, a feature set may be derived from the set of observations. The feature set may include a set of variable types. A variable type may be referred to as a feature. A specific observation may include a set of variable values corresponding to the set of variable types. A set of variable values may be specific to an observation. In some cases, different observations may be associated with different sets of variable values, sometimes referred to as feature values. In some implementations, the machine learning system determines variable values for a specific observation based on input received from the client device. For example, the machine learning system may identify a feature set (e.g., one or more features and/or corresponding feature values) from structured data input to the machine learning system, such as by extracting data from a particular column of a table, extracting data from a particular field of a form, extracting data from a particular field of a message, extracting data received in a structured data format, and/or the like. In some implementations, the machine learning system determines features (e.g., variables types) for a feature set based on input received from the client devices, such as by extracting or generating a name for a column, extracting or generating a name for a field of a form and/or a message, extracting or generating a name based on a structured data format, and/or the like. Additionally, or alternatively, the machine learning system may receive input from an operator to determine features and/or feature values. In some implementations, the machine learning system performs natural language processing and/or another feature identification technique to extract features (e.g., variable types) and/or feature values (e.g., variable values) from text (e.g., unstructured data) input to the machine learning system, such as by identifying keywords and/or values associated with those keywords from the text.

As an example, a feature set for a set of observations may include a first feature of user data, a second feature of transaction card data, a third feature of transaction account data, and so on. As shown, for a first observation, the first feature may have a value of demographics, the second feature may have a value of a first card number (e.g., card number 1), the third feature may have a value of a first account number (e.g., account 1), and so on. These features and feature values are provided as examples, and may differ in other examples. For example, the feature set may include one or more of the following features: user data (e.g., demographics, credit scores, credit lines, ages, locations, and/or the like); transaction card data (e.g., transaction card numbers, types of transaction cards, credit lines for the transaction cards, and/or the like); transaction account data (e.g., transaction account identifiers, types of transaction accounts, credit lines for the transaction accounts, and/or the like); and/or the like. In some implementations, the machine learning system pre-processes and/or performs dimensionality reduction to reduce the feature set and/or combine features of the feature set to a minimum feature set. A machine learning model may be trained on the minimum feature set, thereby conserving resources of the machine learning system (e.g., processing resources, memory resources, and/or the like) used to train the machine learning model.

As shown by reference number 215, the set of observations may be associated with a target variable type. The target variable type may represent a variable having a numeric value (e.g., an integer value, a floating point value, and/or the like), may represent a variable having a numeric value that falls within a range of values or has some discrete possible values, may represent a variable that is selectable from one of multiple options (e.g., one of multiples classes, classifications, labels, and/or the like), may represent a variable having a Boolean value (e.g., 0 or 1, True or False, Yes or No), and/or the like. A target variable type may be associated with a target variable value, and a target variable value may be specific to an observation. In some cases, different observations may be associated with different target variable values.

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model, a predictive model, and/or the like. When the target variable type is associated with continuous target variable values (e.g., a range of numbers and/or the like), the machine learning model may employ a regression technique. When the target variable type is associated with categorical target variable values (e.g., classes, labels, and/or the like), the machine learning model may employ a classification technique.

The machine learning model may be trained on a set of observations that do not include a target variable (or that include a target variable, but the machine learning model is not being executed to predict the target variable). This may be referred to as an unsupervised learning model, an automated data analysis model, an automated signal extraction model, and/or the like. In this case, the machine learning model may learn patterns from the set of observations without labeling or supervision, and may provide output that indicates such patterns, such as by using clustering and/or association to identify related groups of items within the set of observations.

As further shown, the machine learning system may partition the set of observations into a training set 220 that includes a first subset of observations, of the set of observations, and a test set 225 that includes a second subset of observations of the set of observations. The training set 220 may be used to train (e.g., fit, tune, and/or the like) the machine learning model, while the test set 225 may be used to evaluate a machine learning model that is trained using the training set 220. For example, for supervised learning, the test set 225 may be used for initial model training using the first subset of observations, and the test set 225 may be used to test whether the trained model accurately predicts target variables in the second subset of observations. In some implementations, the machine learning system partitions the set of observations into the training set 220 and the test set 225 by including a first portion or a first percentage of the set of observations in the training set 220 (e.g., 75%, 80%, or 85%, among other examples) and including a second portion or a second percentage of the set of observations in the test set 225 (e.g., 25%, 20%, or 15%, among other examples). In some implementations, the machine learning system randomly selects observations to be included in the training set 220 and/or the test set 225.

As shown by reference number 230, the machine learning system may train a machine learning model using the training set 220. This training may include executing, by the machine learning system, a machine learning model to determine a set of model parameters based on the training set 220. In some implementations, the machine learning model includes a regression model (e.g., linear regression, logistic regression, and/or the like), which may include a regularized regression model (e.g., Lasso regression, Ridge regression, Elastic-Net regression, and/or the like). Additionally, or alternatively, the machine learning model may include a decision tree model, which may include a tree ensemble model (e.g., generated using bagging and/or boosting), a random forest model, a boosted trees model, and/or the like. A model parameter may include an attribute of a machine learning model that is learned from data input into the model (e.g., the training set 220). For example, for a regression model, a model parameter may include a regression coefficient (e.g., a weight). For a decision tree model, a model parameter may include a decision tree split location, as an example.

As shown by reference number 235, the machine learning system may use one or more hyperparameter sets 240 to tune the machine learning model. A hyperparameter may include a structural parameter that controls execution of a machine learning model by the machine learning system, such as a constraint applied to the machine learning model. Unlike a model parameter, a hyperparameter is not learned from data input into the model. An example hyperparameter for a regularized regression model includes a strength (e.g., a weight) of a penalty applied to a regression coefficient to mitigate overfitting of the machine learning model to the training set 220. The penalty may be applied based on a size of a coefficient value (e.g., for Lasso regression, such as to penalize large coefficient values), may be applied based on a squared size of a coefficient value (e.g., for Ridge regression, such as to penalize large squared coefficient values), may be applied based on a ratio of the size and the squared size (e.g., for Elastic-Net regression), may be applied by setting one or more feature values to zero (e.g., for automatic feature selection), and/or the like. Example hyperparameters for a decision tree model include a tree ensemble technique to be applied (e.g., bagging, boosting, a random forest model, a boosted trees model, and/or the like), a number of features to evaluate, a number of observations to use, a maximum depth of each decision tree (e.g., a number of branches permitted for the decision tree), a number of decision trees to include in a random forest model, and/or the like.

To train a machine learning model, the machine learning system may identify a set of machine learning models to be trained (e.g., based on operator input that identifies the one or more machine learning models, based on random selection of a set of machine learning models, and/or the like), and may train the set of machine learning models (e.g., independently for each machine learning model in the set) using the training set 220. The machine learning system may tune each machine learning model using one or more hyperparameter sets 240 (e.g., based on operator input that identifies hyperparameter sets 240 to be used, based on randomly generating hyperparameter values, and/or the like). The machine learning system may train a particular machine learning model using a specific machine learning model and a corresponding hyperparameter set 240. In some implementations, the machine learning system trains multiple machine learning models to generate a set of model parameters for each machine learning model, where each machine learning model corresponds to a different combination of a machine learning model and a hyperparameter set 240 for that machine learning model.

In some implementations, the machine learning system performs cross-validation when training a machine learning model. Cross validation can be used to obtain a reliable estimate of machine learning model performance using only the training set 220, and without using the test set 225, such as by splitting the training set 220 into a number of groups (e.g., based on operator input that identifies the number of groups, based on randomly selecting a number of groups, and/or the like) and using those groups to estimate model performance. For example, using k-fold cross-validation, observations in the training set 220 may be split into k groups (e.g., in order or at random). For a training procedure, one group may be marked as a hold-out group, and the remaining groups may be marked as training groups. For the training procedure, the machine learning system may train a machine learning model on the training groups and then test the machine learning model on the hold-out group to generate a cross-validation score. The machine learning system may repeat this training procedure using different hold-out groups and different test groups to generate a cross-validation score for each training procedure. In some implementations, the machine learning system independently trains the machine learning model k times, with each individual group being used as a hold-out group once and being used as a training group k–1 times. The machine learning system may combine the cross-validation scores for each training procedure to generate an overall cross-validation score for the machine learning model. The overall cross-validation score may include, for example, an average cross-validation score (e.g., across all training procedures), a standard deviation across cross-validation scores, a standard error across cross-validation scores, and/or the like.

In some implementations, the machine learning system performs cross-validation when training a machine learning model by splitting the training set into a number of groups (e.g., based on operator input that identifies the number of groups, based on randomly selecting a number of groups, and/or the like). The machine learning system may perform multiple training procedures and may generate a cross-validation score for each training procedure. The machine learning system may generate an overall cross-validation score for each hyperparameter set 240 associated with a particular machine learning model. The machine learning system may compare the overall cross-validation scores for different hyperparameter sets 240 associated with the particular machine learning model, and may select the hyperparameter set 240 with the best (e.g., highest accuracy, lowest error, closest to a desired threshold, and/or the like) overall cross-validation score for training the machine learning model. The machine learning system may then train the machine learning model using the selected hyperparameter set 240, without cross-validation (e.g., using all of data in the training set 220 without any hold-out groups), to generate a single machine learning model for a particular machine learning model. The machine learning system may then test this machine learning model using the test set 225 to generate a performance score, such as a mean squared error (e.g., for regression), a mean absolute error (e.g., for regression), an area under receiver operating characteristic curve (e.g., for classification), and/or the like. If the machine learning model performs adequately (e.g., with a performance score that satisfies a threshold), then the machine learning system may store that machine learning model as a trained machine learning model 245 to be used to analyze new observations, as described below in connection with FIG. 3.

In some implementations, the machine learning system performs cross-validation, as described above, for multiple machine learning models (e.g., independently), such as a regularized regression model, different types of regularized regression models, a decision tree model, different types of decision tree models, and/or the like. Based on performing cross-validation for multiple machine learning models, the machine learning system may generate multiple machine learning models, where each machine learning model has the best overall cross-validation score for a corresponding machine learning model. The machine learning system may then train each machine learning model using the entire training set 220 (e.g., without cross-validation), and may test each machine learning model using the test set 225 to generate a corresponding performance score for each machine learning model. The machine learning model may compare the performance scores for each machine learning model, and may select the machine learning model with the best (e.g., highest accuracy, lowest error, closest to a desired threshold, and/or the like) performance score as the trained machine learning model 245.

As indicated above, FIG. 2 is provided as an example. Other examples may differ from what is described in connection with FIG. 2. For example, the machine learning model may be trained using a different process than what is described in connection with FIG. 2. Additionally, or alternatively, the machine learning model may employ a different machine learning model than what is described in connection with FIG. 2, such as a Bayesian estimation model, a k-nearest neighbor model, an a priori model, a k-means model, a support vector machine model, a neural network model (e.g., a convolutional neural network model), a deep learning model, and/or the like.

Figure 3:
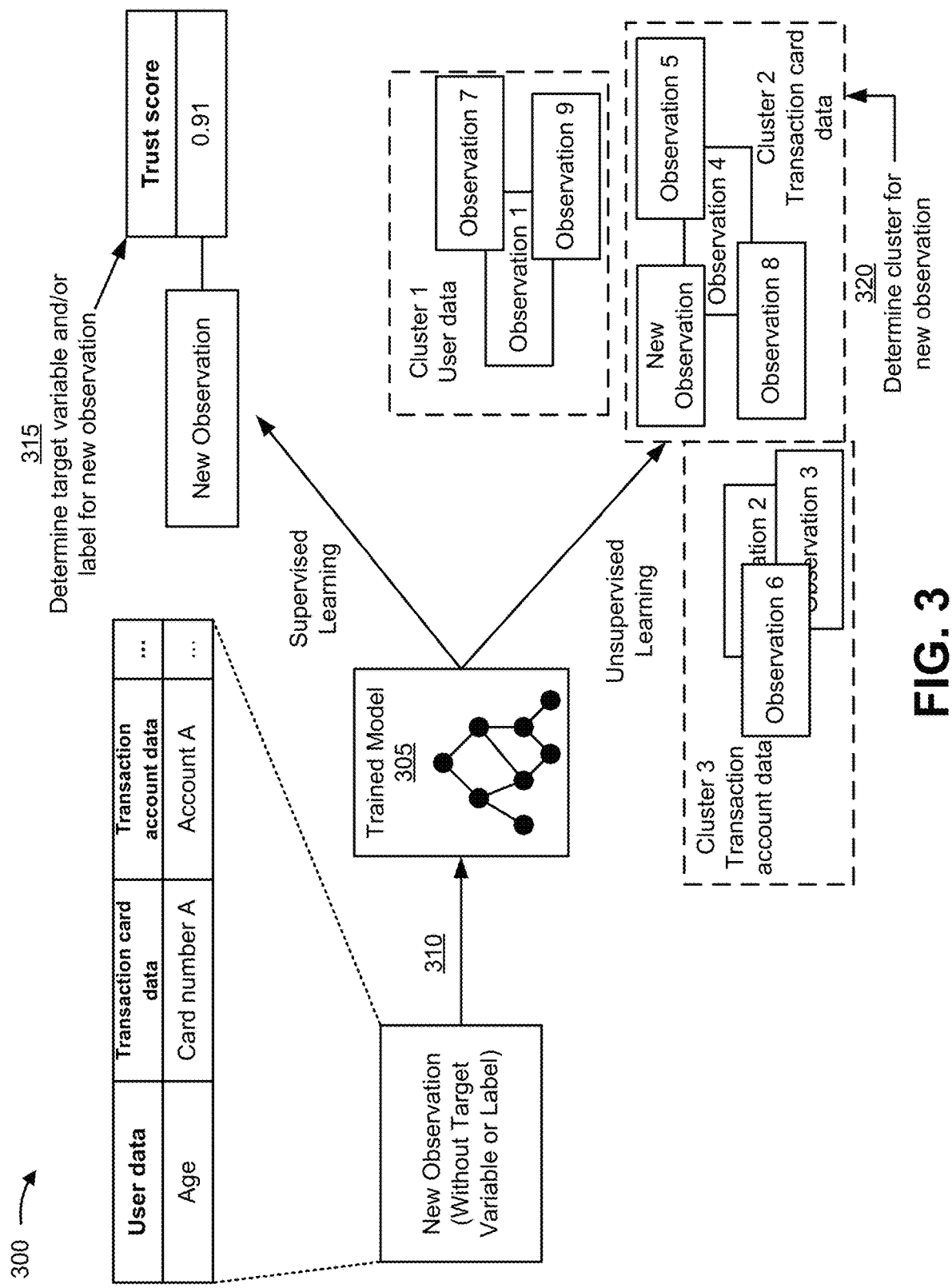
FIG. 3 is a diagram illustrating an example of applying a trained machine learning model to a new observation.

FIG. 3 is a diagram illustrating an example 300 of applying a trained machine learning model to a new observation. The new observation may be input to a machine learning system that stores a trained machine learning model 305. The trained machine learning model 305 may be the trained machine learning model 245 described above in connection with FIG. 2. The machine learning system may include a computing device, a server, a cloud computing environment, and/or the like, such as the trust platform.

As shown by reference number 310, the machine learning system may receive a new observation (or a set of new observations), and may input the new observation to the machine learning model 305. As shown, the new observation may include a first feature of an age of a user, a second feature of card number A, a third feature of account A, and so on, as an example. The machine learning system may apply the trained machine learning model 305 to the new observation to generate an output (e.g., a result). The type of output may depend on the type of machine learning model and/or the type of machine learning task being performed. For example, the output may include a predicted (e.g., estimated) value of target variable (e.g., a value within a continuous range of values, a discrete value, a label, a class, a classification, and/or the like), such as when supervised learning is employed. Additionally, or alternatively, the output may include information that identifies a cluster to which the new observation belongs, information that indicates a degree of similarity between the new observation and one or more prior observations (e.g., which may have previously been new observations input to the machine learning model and/or observations used to train the machine learning model), and/or the like, such as when unsupervised learning is employed.

In some implementations, the trained machine learning model 305 predicts a value of 0.91 for the target variable of a trust score for the new observation, as shown by reference number 315. Based on this prediction (e.g., based on the value having a particular label/classification, based on the value satisfying or failing to satisfy a threshold, and/or the like), the machine learning system may provide a recommendation, such as the user is trustworthy. Additionally, or alternatively, the machine learning system may perform an automated action and/or may cause an automated action to be performed (e.g., by instructing another device to perform the automated action), such as authenticating the user based on the risk score. As another example, if the machine learning system were to predict a value of 0.20 for the target variable of a trust score, then the machine learning system may provide a different recommendation (e.g., the user is not trustworthy) and/or may perform or cause performance of a different automated action (e.g., not authenticating the user based on the risk score). The recommendation and/or the automated action may be based on the target variable value having a particular label (e.g., classification, categorization, and/or the like), may be based on whether the target variable value satisfies one or more threshold (e.g., whether the target variable value is greater than a threshold, is less than a threshold, is equal to a threshold, falls within a range of threshold values, and/or the like), and/or the like.

In some implementations, the trained machine learning model 305 classifies (e.g., cluster) the new observation in a user data cluster, as shown by reference number 320. The observations within a cluster may have a threshold degree of similarity. Based on classifying the new observation in the user data cluster, the machine learning system may provide a recommendation, such as the user is trustworthy based on a credit line. Additionally, or alternatively, the machine learning system may perform an automated action and/or may cause an automated action to be performed (e.g., by instructing another device to perform the automated action), such as authenticating the user based on being trustworthy. As another example, if the machine learning system were to classify the new observation in a transaction card cluster, then the machine learning system may provide a different recommendation (e.g., the transaction card is not trustworthy) and/or may perform or cause performance of a different automated action (e.g., not authenticating a user of the transaction card).

In this way, the machine learning system may apply a rigorous and automated process to generate a geographical map of trusted transaction cards. The machine learning system enables recognition and/or identification of tens, hundreds, thousands, or millions of features and/or feature values for tens, hundreds, thousands, or millions of observations, thereby increasing an accuracy and consistency of generating a geographical map of trusted transaction cards relative to requiring computing resources to be allocated for tens, hundreds, or thousands of operators to manually generate a geographical map of trusted transaction cards using the features or feature values.

As indicated above, FIG. 3 is provided as an example. Other examples may differ from what is described in connection with FIG. 3.

Figure 4:
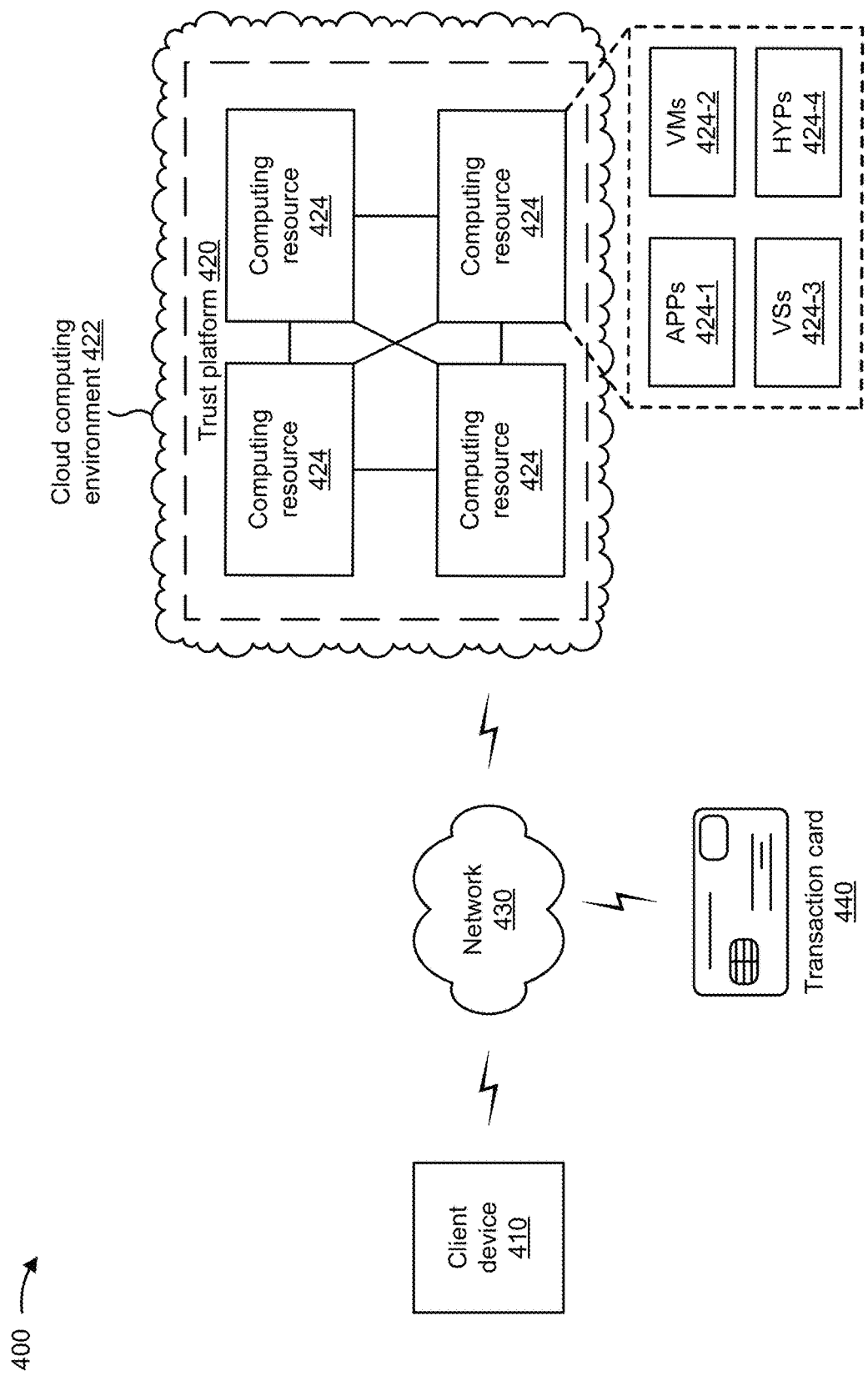
FIG. 4 is a diagram of an example environment in which systems and/or methods described herein may be implemented.

FIG. 4 is a diagram of an example environment 400 in which systems and/or methods described herein may be implemented. As shown in FIG. 4, environment 400 may include a client device 410, a trust platform 420, a network 430, and a transaction card 440. Devices of environment 400 may interconnect via wired connections, wireless connections, or a combination of wired and wireless connections.

Client device 410 includes one or more devices capable of receiving, generating, storing, processing, and/or providing information, such as information described herein. For example, client device 410 may include a mobile phone (e.g., a smart phone, a radiotelephone, and/or the like), a laptop computer, a tablet computer, a desktop computer, a handheld computer, a gaming device, a wearable communication device (e.g., a smart watch, a pair of smart glasses, a heart rate monitor, a fitness tracker, smart clothing, smart jewelry, a head mounted display, and/or the like), or a similar type of device. In some implementations, client device 410 receives information from and/or transmit information to trust platform 420.

Trust platform 420 includes one or more devices that utilize machine learning and trusted transaction card locations to generate a geographical map of the trusted transaction cards. In some implementations, trust platform 420 may be designed to be modular such that certain software components may be swapped in or out depending on a particular need. As such, trust platform 420 may be easily and/or quickly reconfigured for different uses. In some implementations, trust platform 420 receives information from and/or transmits information to one or more client devices 410.

In some implementations, as shown, trust platform 420 may be hosted in a cloud computing environment 422. Notably, while implementations described herein describe trust platform 420 as being hosted in cloud computing environment 422, trust platform 420 may not be cloud-based (i.e., may be implemented outside of a cloud computing environment) or may be partially cloud-based.

Cloud computing environment 422 includes an environment that hosts trust platform 420. Cloud computing environment 422 may provide computation, software, data access, storage, etc., services that do not require end-user knowledge of a physical location and configuration of system(s) and/or device(s) that hosts trust platform 420. As shown, cloud computing environment 422 may include a group of computing resources 424 (referred to collectively as "computing resources 424" and individually as "computing resource 424").

Computing resource 424 includes one or more personal computers, workstation computers, mainframe devices, or other types of computation and/or communication devices. In some implementations, computing resource 424 hosts trust platform 420. The cloud resources may include compute instances executing in computing resource 424, storage devices provided in computing resource 424, data transfer devices provided by computing resource 424, etc. In some implementations, computing resource 424 communicates with other computing resources 424 via wired connections, wireless connections, or a combination of wired and wireless connections.

As further shown in FIG. 4, computing resource 424 includes a group of cloud resources, such as one or more applications ("APPs") 424-1, one or more virtual machines ("VMs") 424-2, virtualized storage ("VSs") 424-3, one or more hypervisors ("HYPs") 424-4, and/or the like.

Application 424-1 includes one or more software applications that may be provided to or accessed by client device 410. Application 424-1 may eliminate a need to install and execute the software applications on client device 410. For example, application 424-1 may include software associated with trust platform 420 and/or any other software capable of being provided via cloud computing environment 422. In some implementations, one application 424-1 sends/receives information to/from one or more other applications 424-1, via virtual machine 424-2.

Virtual machine 424-2 includes a software implementation of a machine (e.g., a computer) that executes programs like a physical machine. Virtual machine 424-2 may be either a system virtual machine or a process virtual machine, depending upon use and degree of correspondence to any real machine by virtual machine 424-2. A system virtual machine may provide a complete system platform that supports execution of a complete operating system ("OS"). A process virtual machine may execute a single program and may support a single process. In some implementations, virtual machine 424-2 executes on behalf of a user (e.g., a user of client device 410 or an operator of trust platform 420), and manages infrastructure of cloud computing environment 422, such as data management, synchronization, or long-duration data transfers.

Virtualized storage 424-3 includes one or more storage systems and/or one or more devices that use virtualization techniques within the storage systems or devices of computing resource 424. In some implementations, within the context of a storage system, types of virtualizations include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 424-4 may provide hardware virtualization techniques that allow multiple operating systems (e.g., "guest operating systems") to execute concurrently on a host computer, such as computing resource 424. Hypervisor 424-4 may present a virtual operating platform to the guest operating systems and may manage the execution of the guest operating systems. Multiple instances of a variety of operating systems may share virtualized hardware resources.

Network 430 includes one or more wired and/or wireless networks. For example, network 430 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or the like, and/or a combination of these or other types of networks.

Transaction card 440 includes a transaction card that can be used to complete a transaction. For example, transaction card 440 may include a credit card, a debit card, a gift card, a payment card, an automated teller machine (ATM) card, a stored-value card, a fleet card, a room or building access card, a driver's license card, and/or the like. Transaction card 440 may be capable of storing and/or communicating data for a POS transaction with a transaction terminal. For example, transaction card 440 may store and/or communicate data, including account information (e.g., an account identifier, a cardholder identifier, etc.), expiration information of transaction card 440 (e.g., information identifying an expiration month and/or year of transaction card 440), banking information (e.g., a routing number of a bank, a bank identifier, etc.), transaction information (e.g., a payment token), and/or the like. For example, to store and/or communicate the data, transaction card 440 may include a magnetic strip and/or an integrated circuit (IC) chip.

In some implementations, transaction card 440 includes an antenna to communicate data associated with transaction card 440. The antenna may be a passive radio frequency (RF) antenna, an active RF antenna, a battery-assisted RF antenna, and/or the like. In some implementations, transaction card 440 may be a smart transaction card, capable of communicating wirelessly (e.g., via Bluetooth, Bluetooth Low Energy (BLE), near-field communication (NFC), WiFi, and/or the like) with other devices, such as client device 410, trust platform 420, a digital wallet, an NFC attached to a price tag, and/or the like. In some implementations, transaction card 440 communicates with client device 410 to complete a transaction (e.g., based on being moved within communicative proximity of client device 410).

The number and arrangement of devices and networks shown in FIG. 4 are provided as an example. In practice, there may be additional devices and/or networks, fewer devices and/or networks, different devices and/or networks, or differently arranged devices and/or networks than those shown in FIG. 4. Furthermore, two or more devices shown in FIG. 4 may be implemented within a single device, or a single device shown in FIG. 4 may be implemented as multiple, distributed devices. Additionally, or alternatively, a set of devices (e.g., one or more devices) of environment 400 may perform one or more functions described as being performed by another set of devices of environment 400.

Figure 5:
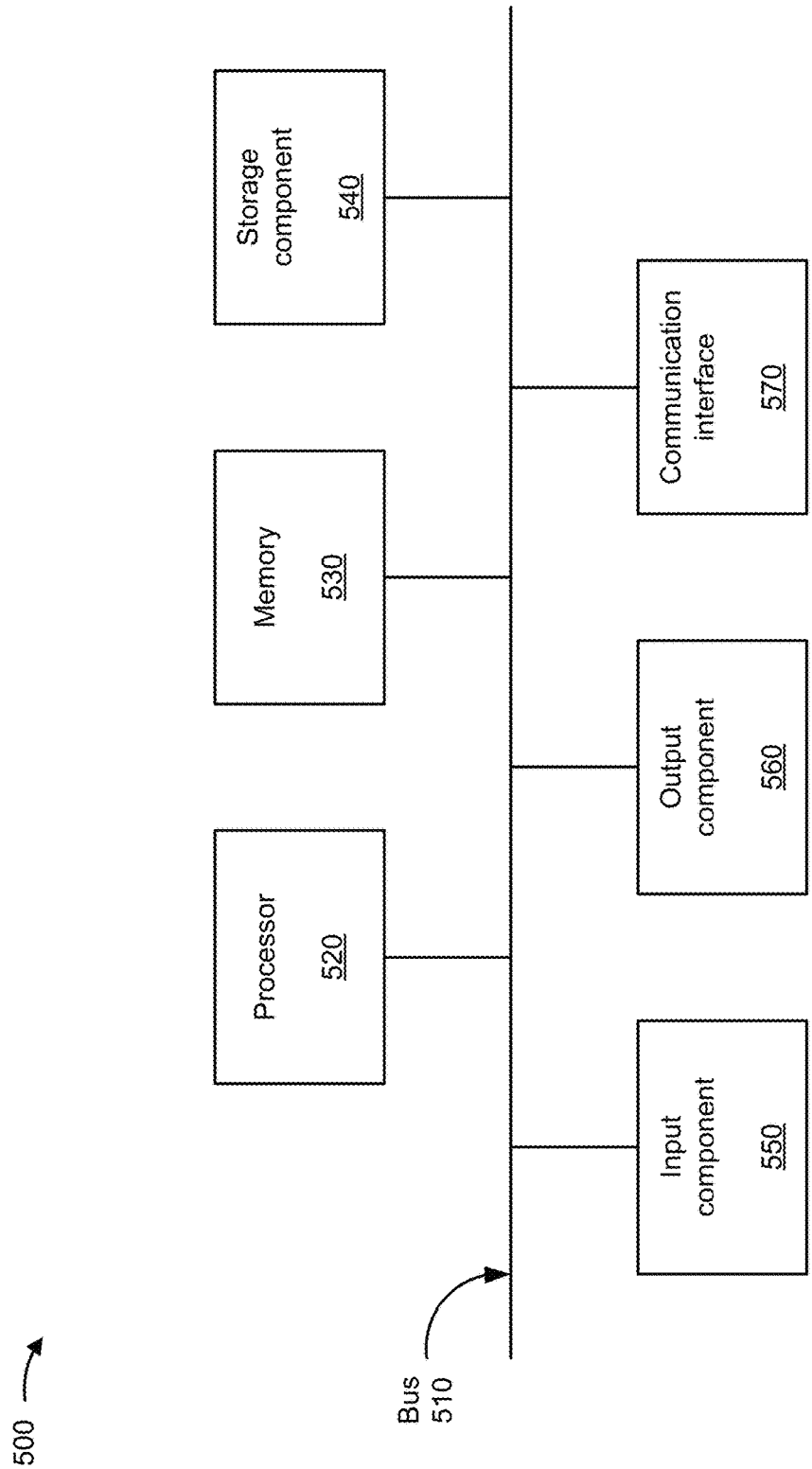
FIG. 5 is a diagram of example components of one or more devices of FIG. 4.

FIG. 5 is a diagram of example components of a device 500. Device 500 may correspond to client device 410, trust platform 420, computing resource 424, and/or transaction card 440. In some implementations, client device 410, trust platform 420, computing resource 424, and/or transaction card 440 includes one or more devices 500 and/or one or more components of device 500. As shown in FIG. 5, device 500 may include a bus 510, a processor 520, a memory 530, a storage component 540, an input component 550, an output component 560, and a communication interface 570.

Bus 510 includes a component that permits communication among the components of device 500. Processor 520 is implemented in hardware, firmware, or a combination of hardware and software. Processor 520 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 520 includes one or more processors capable of being programmed to perform a function. Memory 530 includes a random-access memory (RAM), a read only memory (ROM), and/or another type of dynamic or static storage device (e.g., a flash memory, a magnetic memory, and/or an optical memory) that stores information and/or instructions for use by processor 520.

Storage component 540 stores information and/or software related to the operation and use of device 500. For example, storage component 540 may include a hard disk (e.g., a magnetic disk, an optical disk, a magneto-optic disk, and/or a solid-state disk), a compact disc (CD), a digital versatile disc (DVD), a floppy disk, a cartridge, a magnetic tape, and/or another type of non-transitory computer-readable medium, along with a corresponding drive.

Input component 550 includes a component that permits device 500 to receive information, such as via user input (e.g., a touch screen display, a keyboard, a keypad, a mouse, a button, a switch, and/or a microphone). Additionally, or alternatively, input component 550 may include a sensor for sensing information (e.g., a global positioning system (GPS) component, an accelerometer, a gyroscope, and/or an actuator). Output component 560 includes a component that provides output information from device 500 (e.g., a display, a speaker, and/or one or more light-emitting diodes (LEDs)).

Communication interface 570 includes a transceiver-like component (e.g., a transceiver and/or a separate receiver and transmitter) that enables device 500 to communicate with other devices, such as via a wired connection, a wireless connection, or a combination of wired and wireless connections. Communication interface 570 may permit device 500 to receive information from another device and/or provide information to another device. For example, communication interface 570 may include an Ethernet interface, an optical interface, a coaxial interface, an infrared interface, a radio frequency (RF) interface, a universal serial bus (USB) interface, a Wi-Fi interface, a cellular network interface, and/or the like.

Device 500 may perform one or more processes described herein. Device 500 may perform these processes based on processor 520 executing software instructions stored by a non-transitory computer-readable medium, such as memory 530 and/or storage component 540. A computer-readable medium is defined herein as a non-transitory memory device. A memory device includes memory space within a single physical storage device or memory space spread across multiple physical storage devices.

Software instructions may be read into memory 530 and/or storage component 540 from another computer-readable medium or from another device via communication interface 570. When executed, software instructions stored in memory 530 and/or storage component 540 may cause processor 520 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 5 are provided as an example. In practice, device 500 may include additional components, fewer components, different components, or differently arranged components than those shown in FIG. 5. Additionally, or alternatively, a set of components (e.g., one or more components) of device 500 may perform one or more functions described as being performed by another set of components of device 500.

FIG. 6 is a flow chart of an example process 600 for utilizing machine learning and a smart transaction card to automatically identify item data associated with purchased items. In some implementations, one or more process blocks of FIG. 6 are performed by a device (e.g., trust platform 420). In some implementations, one or more process blocks of FIG. 6 are performed by another device or a group of devices separate from or including the device, such as a client device (e.g., client device 410).

As shown in FIG. 6, process 600 may include receiving, from client devices associated with users, user data identifying the users, client device data identifying the client devices, and transaction card data identifying transaction cards associated with the users and the client devices (block 610). For example, the device (e.g., using computing resource 424, processor 520, communication interface 570, and/or the like) may receive, from client devices associated with users, user data identifying the users, client device data identifying the client devices, and transaction card data identifying transaction cards associated with the users and the client devices, as described above.

As further shown in FIG. 6, process 600 may include receiving transaction account data identifying transaction accounts associated with a plurality of transaction account users (block 620). For example, the device (e.g., using computing resource 424, processor 520, communication interface 570, and/or the like) may receive transaction account data identifying transaction accounts associated with a plurality of transaction account users, as described above.

As further shown in FIG. 6, process 600 may include processing the user data, the client device data, the transaction card data, and the transaction account data, with a machine learning model, to determine trust scores associated with the transaction cards (block 630). For example, the device (e.g., using computing resource 424, processor 520, memory 530, and/or the like) may process the user data, the client device data, the transaction card data, and the transaction account data, with a machine learning model, to determine trust scores associated with the transaction cards, as described above.

As further shown in FIG. 6, process 600 may include identifying a network of trusted transaction cards, from the transaction cards, based on the transaction card data and the trust scores associated with the transaction cards (block 640). For example, the device (e.g., using computing resource 424, processor 520, storage component 540, and/or the like) may identify a network of trusted transaction cards, from the transaction cards, based on the transaction card data and the trust scores associated with the transaction cards, as described above.

As further shown in FIG. 6, process 600 may include receiving, from trusted client devices associated with the trusted transaction cards, location data identifying locations of the trusted client devices and communication data indicating that the trusted transaction cards are communicatively coupled with the trusted client devices (block 650). For example, the device (e.g., using computing resource 424, processor 520, memory 530, communication interface 570, and/or the like) may receive, from trusted client devices associated with the trusted transaction cards, location data identifying locations of the trusted client devices and communication data indicating that the trusted transaction cards are communicatively coupled with the trusted client devices, as described above.

As further shown in FIG. 6, process 600 may include processing the location data and the communication data, with a mapping model, to generate a card mapping for the trusted transaction cards communicatively coupled with the trusted client devices (block 660). For example, the device (e.g., using computing resource 424, processor 520, memory 530, storage component 540, and/or the like) may process the location data and the communication data, with a mapping model, to generate a card mapping for the trusted transaction cards communicatively coupled with the trusted client devices, as described above.

As further shown in FIG. 6, process 600 may include performing one or more actions based on the card mapping (block 670). For example, the device (e.g., using computing resource 424, processor 520, memory 530, storage component 540, communication interface 570, and/or the like) may perform one or more actions based on the card mapping, as described above.

Process 600 may include additional implementations, such as any single implementation or any combination of implementations described below and/or in connection with one or more other processes described elsewhere herein.

In a first implementation, process 600 may include processing the card mapping and a geographical map, with the mapping model, to generate a final card mapping for the trusted transaction cards communicatively coupled with the trusted client devices.

In a second implementation, alone or in combination with the first implementation, performing the one or more actions may include providing the card mapping to the trusted client devices communicatively coupled with the trusted transaction cards; enabling one of the trusted transaction cards to locate another one of the trusted transaction cards for authentication of the one of the trusted transaction cards; or enabling one of the trusted transaction cards to locate another one of the trusted transaction cards that is physically closest to the one of the trusted transaction cards so that emergency services may be provided to a particular user associated with the one of the trusted transaction cards.

In a third implementation, alone or in combination with one or more of the first and second implementations, performing the one or more actions may include enabling a merchant device conducting a transaction with one of the trusted transaction cards to locate another one of the trusted transaction cards that is physically closest to the one of the trusted transaction cards; causing an autonomous vehicle to navigate to a location of one of the trusted client devices communicatively coupled with one of the trusted transaction cards based on the card mapping; or retraining the machine learning model or the mapping model based on the card mapping.

In a fourth implementation, alone or in combination with one or more of the first through third implementations, process 600 may include receiving, from one of the trusted client devices associated with one of the trusted transaction cards, updated location data indicating movement of the one of the trusted client devices; and updating the card mapping based on the updated location indicating movement of the one of the trusted client devices.

In a fifth implementation, alone or in combination with one or more of the first through fourth implementations, the card mapping may include data identifying one or more of: orientations of the trusted client devices, accelerations of the trusted client devices, or distances between the trusted client devices.

In a sixth implementation, alone or in combination with one or more of the first through fifth implementations, the machine learning model may include a linear classifier model, a nearest neighbor model, a support vector machine model, a decision tree model, a random forest model, or a neural network model.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

FIG. 7 is a flow chart of an example process 700 for utilizing machine learning and a smart transaction card to automatically identify item data associated with purchased items. In some implementations, one or more process blocks of FIG. 7 are performed by a device (e.g., trust platform 420). In some implementations, one or more process blocks of FIG. 7 are performed by another device or a group of devices separate from or including the device, such as a client device (e.g., client device 410).

As shown in FIG. 7, process 700 may include determining trust scores associated with transaction cards, wherein the trust scores are determined based on user data identifying users of the transaction cards, client device data identifying client devices associated with the users, transaction card data identifying the transaction cards, and transaction account data identifying transaction accounts associated with a plurality of transaction account users (block 710). For example, the device (e.g., using computing resource 424, processor 520, memory 530, and/or the like) may determine trust scores associated with transaction cards, as described above. In some implementations, the trust scores may be determined based on user data identifying users of the transaction cards, client device data identifying client devices associated with the users, transaction card data identifying the transaction cards, and transaction account data identifying transaction accounts associated with a plurality of transaction account users.

As further shown in FIG. 7, process 700 may include identifying a network of trusted transaction cards, from the transaction cards, based on the transaction card data and the trust scores associated with the transaction cards (block 720). For example, the device (e.g., using computing resource 424, processor 520, storage component 540, and/or the like) may identify a network of trusted transaction cards, from the transaction cards, based on the transaction card data and the trust scores associated with the transaction cards, as described above.

As further shown in FIG. 7, process 700 may include receiving, from trusted client devices associated with the trusted transaction cards, location data identifying locations of the trusted client devices and communication data indicating that the trusted transaction cards are communicatively coupled with the trusted client devices (block 730). For example, the device (e.g., using computing resource 424, processor 520, communication interface 570, and/or the like) may receive, from trusted client devices associated with the trusted transaction cards, location data identifying locations of the trusted client devices and communication data indicating that the trusted transaction cards are communicatively coupled with the trusted client devices, as described above.

As further shown in FIG. 7, process 700 may include processing the location data and the communication data, with a mapping model, to generate a card mapping for the trusted transaction cards communicatively coupled with the trusted client devices (block 740). For example, the device (e.g., using computing resource 424, processor 520, memory 530, and/or the like) may process the location data and the communication data, with a mapping model, to generate a card mapping for the trusted transaction cards communicatively coupled with the trusted client devices, as described above.

As further shown in FIG. 7, process 700 may include processing the card mapping and a geographical map, with the mapping model, to generate a final card mapping for the trusted transaction cards communicatively coupled with the trusted client devices (block 750). For example, the device (e.g., using computing resource 424, processor 520, storage component 540, and/or the like) may process the card mapping and a geographical map, with the mapping model, to generate a final card mapping for the trusted transaction cards communicatively coupled with the trusted client devices, as described above.

As further shown in FIG. 7, process 700 may include performing one or more actions based on the final card mapping (block 760). For example, the device (e.g., using computing resource 424, processor 520, memory 530, storage component 540, communication interface 570, and/or the like) may perform one or more actions based on the final card mapping, as described above.

Process 700 may include additional implementations, such as any single implementation or any combination of implementations described below and/or in connection with one or more other processes described elsewhere herein.

In a first implementation, process 700 may include receiving updated user data associated with a particular user of the users, updated client device data associated with a particular client device of the particular user, or updated transaction card data associated with a particular transaction card of the particular user; and updating a trust score associated with the particular transaction card based on the one or more of the updated user, the updated client data, or the updated transaction card data.

In a second implementation, alone or in combination with the first implementation, process 700 may include receiving global navigation satellite system coordinates associated with the trusted client devices, and processing the card mapping and the geographical map, with the mapping model, to generate the final card mapping may include processing the card mapping and the global navigation satellite system coordinates, with the mapping model, to generate the final card mapping for the trusted transaction cards communicatively coupled with the trusted client devices.

In a third implementation, alone or in combination with one or more of the first and second implementations, processing the card mapping and the geographical map, with the mapping model, to generate the final card mapping may include overlaying the card mapping on the geographical map to generate the final card mapping for the trusted transaction cards communicatively coupled with the trusted client devices.

In a fourth implementation, alone or in combination with one or more of the first through third implementations, process 700 may include providing the final card mapping to the trusted client devices, wherein the final card mapping enables one of the trusted client devices to identify and communicate with another one of the trusted client devices that is within a communication distance of the one of the trusted client devices.

In a fifth implementation, alone or in combination with one or more of the first through fourth implementations, each of the transaction cards may include a credit card, a debit card, a gift card, a payment card, an automated teller machine card, a stored-value card, or a fleet card.

In a sixth implementation, alone or in combination with one or more of the first through fifth implementations, each of the transaction cards may store and communicate data with corresponding ones of the client devices.

Although FIG. 7 shows example blocks of process 700, in some implementations, process 700 may include additional blocks, fewer blocks, different blocks, or differently arranged blocks than those depicted in FIG. 7. Additionally, or alternatively, two or more of the blocks of process 700 may be performed in parallel.

FIG. 8 is a flow chart of an example process 800 for utilizing machine learning and a smart transaction card to automatically identify item data associated with purchased items. In some implementations, one or more process blocks of FIG. 8 are performed by a device (e.g., trust platform 420). In some implementations, one or more process blocks of FIG. 8 are performed by another device or a group of devices separate from or including the device, such as a client device (e.g., client device 410).

As shown in FIG. 8, process 800 may include receiving, from client devices associated with users, user data identifying the users, client device data identifying the client devices, and transaction card data identifying transaction cards associated with the users and the client devices (block 810). For example, the device (e.g., using computing resource 424, processor 520, communication interface 570, and/or the like) may receive, from client devices associated with users, user data identifying the users, client device data identifying the client devices, and transaction card data identifying transaction cards associated with the users and the client devices, as described above.

As further shown in FIG. 8, process 800 may include receiving transaction account data identifying transaction accounts associated with a plurality of transaction account users (block 820). For example, the device (e.g., using computing resource 424, processor 520, storage component 540, communication interface 570, and/or the like) may receive transaction account data identifying transaction accounts associated with a plurality of transaction account users, as described above.

As further shown in FIG. 8, process 800 may include processing the user data, the client device data, the transaction card data, and the transaction account data, with a machine learning model, to determine trust scores associated with the transaction cards (block 830). For example, the device (e.g., using computing resource 424, processor 520, memory 530, and/or the like) may process the user data, the client device data, the transaction card data, and the transaction account data, with a machine learning model, to determine trust scores associated with the transaction cards, as described above.

As further shown in FIG. 8, process 800 may include identifying a network of trusted transaction cards, from the transaction cards, based on the transaction card data and the trust scores associated with the transaction cards (block 840). For example, the device (e.g., using computing resource 424, processor 520, storage component 540, and/or the like) may identify a network of trusted transaction cards, from the transaction cards, based on the transaction card data and the trust scores associated with the transaction cards, as described above.

As further shown in FIG. 8, process 800 may include receiving, from trusted client devices associated with the trusted transaction cards, location data identifying locations of the trusted client devices and communication data indicating that the trusted transaction cards are communicatively coupled with the trusted client devices (block 850). For example, the device (e.g., using computing resource 424, processor 520, and/or the like) may receive, from trusted client devices associated with the trusted transaction cards, location data identifying locations of the trusted client devices and communication data indicating that the trusted transaction cards are communicatively coupled with the trusted client devices, as described above.

As further shown in FIG. 8, process 800 may include processing the location data and the communication data, with a mapping model, to generate a card mapping for the trusted transaction cards communicatively coupled with the trusted client devices (block 860). For example, the device (e.g., using computing resource 424, processor 520, memory 530, and/or the like) may process the location data and the communication data, with a mapping model, to generate a card mapping for the trusted transaction cards communicatively coupled with the trusted client devices, as described above.

As further shown in FIG. 8, process 800 may include processing the card mapping and a geographical map, with the mapping model, to generate a final card mapping for the trusted transaction cards communicatively coupled with the trusted client devices (block 870). For example, the device (e.g., using computing resource 424, processor 520, storage component 540, and/or the like) may process the card mapping and a geographical map, with the mapping model, to generate a final card mapping for the trusted transaction cards communicatively coupled with the trusted client devices, as described above.

As further shown in FIG. 8, process 800 may include performing one or more actions based on the final card mapping (block 880). For example, the device (e.g., using computing resource 424, processor 520, memory 530, storage component 540, communication interface 570, and/or the like) may perform one or more actions based on the final card mapping, as described above.

Process 800 may include additional implementations, such as any single implementation or any combination of implementations described below and/or in connection with one or more other processes described elsewhere herein.

In a first implementation, performing the one or more actions may include providing the final card mapping to the trusted client devices communicatively coupled with the trusted transaction cards; enabling one of the trusted transaction cards to locate another one of the trusted transaction cards for authentication of the one of the trusted transaction cards; enabling one of the trusted transaction cards to locate another one of the trusted transaction cards that is physically closest to the one of the trusted transaction cards so that emergency services may be provided to a particular user associated with the one of the trusted transaction cards; enabling a merchant device conducting a transaction with one of the trusted transaction cards to locate another one of the trusted transaction cards that is physically closest to the one of the trusted transaction cards; causing an autonomous vehicle to navigate to a location of one of the trusted client devices communicatively coupled with one of the trusted transaction cards based on the final card mapping; or retraining the machine learning model or the mapping model based on the final card mapping.

In a second implementation, alone or in combination with the first implementation, process 800 may include receiving, from one of the trusted client devices associated with one of the trusted transaction cards, updated location data indicating movement of the one of the trusted client devices; and updating the final card mapping based on the updated location indicating movement of the one of the trusted client devices.

In a third implementation, alone or in combination with one or more of the first and second implementations, process 800 may include receiving updated user data associated with a particular user of the users, updated client device data associated with a particular client device of the particular user, or updated transaction card data associated with a particular transaction card of the particular user; and updating a trust score associated with the particular transaction card based on the one or more of the updated user, the updated client data, or the updated transaction card data.

In a fourth implementation, alone or in combination with one or more of the first through third implementations, the geographical map may be based on global navigation satellite system coordinates associated with the trusted client devices.

In a fifth implementation, alone or in combination with one or more of the first through fourth implementations, process 800 may include providing the final card mapping to the trusted client devices, wherein the final card mapping enables one of the trusted client devices to identify and communicate with another one of the trusted client devices that is within a communication distance of the one of the trusted client devices.

Although FIG. 8 shows example blocks of process 800, in some implementations, process 800 may include additional blocks, fewer blocks, different blocks, or differently arranged blocks than those depicted in FIG. 8. Additionally, or alternatively, two or more of the blocks of process 800 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
   receiving, by a device and from client devices associated with users, user data identifying the users, client device data identifying the client devices, and transaction card data identifying transaction cards associated with the users and the client devices;
   receiving, by the device, transaction account data identifying transaction accounts associated with a plurality of transaction account users;
   training, by the device, a machine learning model to determine trust scores associated with the transaction cards,
      wherein the machine learning model includes a neural network model trained based on historical user data, historical client device data, and historical transaction card data,
      wherein training the machine learning model comprises:
         performing dimensionality reduction to reduce the historical user data, the historical client device data, and the historical transaction card data to a minimum feature set, and
         training, using a neural network technique, the machine learning model based on the minimum feature set;
   processing, by the device, the user data, the client device data, the transaction card data, and the transaction account data using the machine learning model to determine the trust scores associated with the transaction cards;
   identifying, by the device, a network of trusted transaction cards, from the transaction cards, based on the transaction card data and the trust scores associated with the transaction cards;
   receiving, by the device and from trusted client devices associated with the trusted transaction cards, location data identifying locations of the trusted client devices and communication data indicating that the trusted transaction cards are communicatively coupled with the trusted client devices;
   processing, by the device, the location data and the communication data, with a mapping model, to generate a card mapping for the trusted transaction cards communicatively coupled with the trusted client devices,
      wherein the mapping model is trained based on historical location data and historical communication data to generate the card mapping that track positions and movements of the trusted transaction cards communicatively coupled with the trusted client devices,
      wherein the card mapping includes trusted transaction cards represented as nodes, and
      wherein processing the location data and the communication data comprises:
         using the mapping model to determine an orientation and distance of a node, of the nodes, from other nodes of the nodes, wherein the distance of the node from the other nodes corresponds to a distance of a trusted client device from other trusted client devices;
associating, by the device, particular location data corresponding to each node, of the nodes, with positional data corresponding to respective points on a geographical map;
overlaying, by the device, the card mapping on the geographical map based on associating the particular location data corresponding to each node with the positional data corresponding to the respective points on the geographical map;
retraining, by the device, the machine learning model based on the card mapping; and
performing, by the device, one or more actions based on the card mapping,
wherein the one or more actions comprise using the geographical map to enable a first trusted transaction card to be used in relation to a second trusted transaction card.

2. The method of claim 1, further comprising:
processing the card mapping and the geographical map, with the mapping model, to generate a final card mapping for the trusted transaction cards communicatively coupled with the trusted client devices.

3. The method of claim 1, wherein performing the one or more actions comprises one or more of:
providing the card mapping to the trusted client devices communicatively coupled with the trusted transaction cards;
enabling one of the trusted transaction cards to locate another one of the trusted transaction cards for authentication of the one of the trusted transaction cards; or
enabling one of the trusted transaction cards to locate another one of the trusted transaction cards that is physically closest to the one of the trusted transaction cards so that emergency services may be provided to a particular user associated with the one of the trusted transaction cards.

4. The method of claim 1, wherein performing the one or more actions comprises one or more of:
enabling a merchant device conducting a transaction with one of the trusted transaction cards to locate another one of the trusted transaction cards that is physically closest to the one of the trusted transaction cards;
causing an autonomous vehicle to navigate to a location of one of the trusted client devices communicatively coupled with one of the trusted transaction cards based on the card mapping; or
retraining the mapping model based on the card mapping.

5. The method of claim 1, further comprising:
receiving, from one of the trusted client devices associated with one of the trusted transaction cards, updated location data indicating movement of the one of the trusted client devices; and
updating the card mapping based on the updated location data indicating the movement of the one of the trusted client devices.

6. The method of claim 1, wherein the card mapping includes data identifying one or more of:
orientations of the trusted client devices,
accelerations of the trusted client devices, or
distances between the trusted client devices.

7. The method of claim 1, wherein the machine learning model includes one or more of:
a linear classifier model,
a nearest neighbor model,
a support vector machine model,
a decision tree model, or
a random forest model.

8. A device, comprising:
one or more memories; and
one or more processors, communicatively coupled to the one or more memories, configured to:
train a machine learning model to determine trust scores associated with transaction cards,
wherein the machine learning model includes a first neural network model trained based on historical user data, historical client device data, and historical transaction card data,
wherein the one or more processors, to train the machine learning model, are configured to:
perform dimensionality reduction to reduce the historical user data, the historical client device data, and the historical transaction card data to a minimum feature set, and
train, using a neural network technique, the machine learning model based on the minimum feature set;
determine the trust scores associated with the transaction cards,
wherein the trust scores associated with the transaction cards are determined based on user data identifying users of the transaction cards, client device data identifying client devices associated with the users, transaction card data identifying the transaction cards, and transaction account data identifying transaction accounts associated with a plurality of transaction account users;
identify a network of trusted transaction cards, from the transaction cards, based on the transaction card data and the trust scores associated with the transaction cards;
receive, from trusted client devices associated with the trusted transaction cards, location data identifying locations of the trusted client devices and communication data indicating that the trusted transaction cards are communicatively coupled with the trusted client devices;
process the location data and the communication data, with a mapping model, to generate a card mapping for the trusted transaction cards communicatively coupled with the trusted client devices,
wherein the mapping model includes a second neural network model trained based on historical location data and historical communication data to generate the card mapping that track positions and movements of the trusted transaction cards communicatively coupled with the trusted client devices,
wherein the card mapping includes trusted transaction cards represented as nodes, and
wherein the one or more processors, to process the location data and the communication data, are configured to:
use the mapping model to determine an orientation and distance of a node, of the nodes, from other nodes of the nodes,
wherein the distance of the node from the other nodes corresponds to a distance of a trusted client device from other trusted client devices;
process the card mapping and a geographical map, with the mapping model, to generate a final card mapping for the trusted transaction cards communicatively coupled with the trusted client devices,
  wherein the one or more processors, to process the card mapping and the geographical map, are configured to:
    associate particular location data corresponding to each node, of the nodes, with positional data corresponding to respective points on the geographical map, and
    overlay the card mapping on the geographical map based on associating the particular location data corresponding to each node with the positional data corresponding to the respective points on the geographical map;
  retrain the mapping model based on the final card mapping; and
  perform one or more actions based on the final card mapping.

9. The device of claim 8, wherein the one or more processors are further configured to:
  receive one or more of:
    updated user data associated with a particular user of the users,
    updated client device data associated with a particular client device of the particular user, or
    updated transaction card data associated with a particular transaction card of the particular user; and
  update a trust score associated with the particular transaction card based on the one or more of the updated user data, the updated client device data, or the updated transaction card data.

10. The device of claim 8, wherein the one or more processors are further configured to:
  receive global navigation satellite system coordinates associated with the trusted client devices,
    wherein the one or more processors, when processing the card mapping and the geographical map, with the mapping model, to generate the final card mapping, are configured to:
      process the card mapping and the global navigation satellite system coordinates, with the mapping model, to generate the final card mapping for the trusted transaction cards communicatively coupled with the trusted client devices.

11. The device of claim 8, wherein the one or more processors, when processing the card mapping and the geographical map, with the mapping model, to generate the final card mapping, are configured to:
  overlay the card mapping on the geographical map to generate the final card mapping for the trusted transaction cards communicatively coupled with the trusted client devices.

12. The device of claim 8, wherein the one or more processors are further configured to:
  provide the final card mapping to the trusted client devices,
    wherein the final card mapping enables one of the trusted client devices to identify and communicate with another one of the trusted client devices that is within a communication distance of the one of the trusted client devices.

13. The device of claim 8, wherein the one or more actions include distributing a firmware update to at least one of:
  one or more of the trusted client devices, or
  one or more of the trusted transaction cards.

14. The device of claim 8, where each of the transaction cards store and communicate data with corresponding ones of the client devices.

15. A non-transitory computer-readable medium storing instructions, the instructions comprising:
  one or more instructions that, when executed by one or more processors, cause the one or more processors to:
    receive, from client devices associated with users, user data identifying the users, client device data identifying the client devices, and transaction card data identifying transaction cards associated with the users and the client devices;
    receive transaction account data identifying transaction accounts associated with a plurality of transaction account users;
    train a machine learning model to determine trust scores associated with the transaction cards,
      wherein the machine learning model includes a neural network model trained based on historical user data, historical client device data, and historical transaction card data,
      wherein the one or more instructions, that cause the one or more processors to train the machine learning model, cause the one or more processors to:
        perform dimensionality reduction to reduce the historical user data, the historical client device data, and the historical transaction card data to a minimum feature set, and
        train, using a neural network technique, the machine learning model based on the minimum feature set;
    process the user data, the client device data, the transaction card data, and the transaction account data, using the machine learning model to determine the trust scores associated with the transaction cards;
    identify a network of trusted transaction cards, from the transaction cards, based on the transaction card data and the trust scores associated with the transaction cards;
    receive, from trusted client devices associated with the trusted transaction cards, location data identifying locations of the trusted client devices and communication data indicating that the trusted transaction cards are communicatively coupled with the trusted client devices;
    process the location data and the communication data, with a mapping model, to generate a card mapping for the trusted transaction cards communicatively coupled with the trusted client devices,
      wherein the mapping model includes a neural network model trained based on historical location data and historical communication data to generate the card mapping that track positions and movements of the trusted transaction cards communicatively coupled with the trusted client devices;
      wherein the card mapping includes trusted transaction cards represented as nodes, and
      wherein the one or more instructions, that cause the one or more processors to process the location data and the communication data cause the one or more processors to use:
        the mapping model to determine an orientation and distance of a node, of the nodes, from other nodes of the nodes, wherein the distance of the node from the other nodes corresponds to a distance of a trusted client device from other trusted client devices;
process the card mapping and a geographical map, with the mapping model, to generate a final card mapping for the trusted transaction cards communicatively coupled with the trusted client devices,
wherein the one or more instructions, that cause the one or more processors to process the card mapping and the geographical map, cause the one or more processors to:
associate particular location data corresponding to each node, of the nodes, with positional data corresponding to respective points on the geographical map, and
overlay the card mapping on the geographical map based on associating the particular location data corresponding to each node with the positional data corresponding to the respective points on the geographical map;
retrain the machine learning model based on the final card mapping; and
perform one or more actions based on the final card mapping.

16. The non-transitory computer-readable medium of claim 15, wherein the one or more instructions, that cause the one or more processors to perform the one or more actions, cause the one or more processors to one or more of:
provide the final card mapping to the trusted client devices communicatively coupled with the trusted transaction cards;
enable one of the trusted transaction cards to locate another one of the trusted transaction cards for authentication of the one of the trusted transaction cards;
enable one of the trusted transaction cards to locate another one of the trusted transaction cards that is physically closest to the one of the trusted transaction cards so that emergency services may be provided to a particular user associated with the one of the trusted transaction cards;
enable a merchant device conducting a transaction with one of the trusted transaction cards to locate another one of the trusted transaction cards that is physically closest to the one of the trusted transaction cards;
cause an autonomous vehicle to navigate to a location of one of the trusted client devices communicatively coupled with one of the trusted transaction cards based on the final card mapping; or
retrain the mapping model based on the final card mapping.

17. The non-transitory computer-readable medium of claim 15, wherein the one or more instructions, when executed by the one or more processors, further cause the one or more processors to:
receive, from one of the trusted client devices associated with one of the trusted transaction cards, updated location data indicating movement of the one of the trusted client devices; and
update the final card mapping based on the updated location data indicating the movement of the one of the trusted client devices.

18. The non-transitory computer-readable medium of claim 15, wherein the one or more instructions, when executed by the one or more processors, further cause the one or more processors to:
receive one or more of:
updated user data associated with a particular user of the users,
updated client device data associated with a particular client device of the particular user, or
updated transaction card data associated with a particular transaction card of the particular user; and
update a trust score associated with the particular transaction card based on the one or more of the updated user data, the updated client device data, or the updated transaction card data.

19. The non-transitory computer-readable medium of claim 15, wherein the geographical map is based on global navigation satellite system coordinates associated with the trusted client devices.

20. The non-transitory computer-readable medium of claim 15, wherein the one or more instructions, when executed by the one or more processors, further cause the one or more processors to:
provide the final card mapping to the trusted client devices,
wherein the final card mapping enables one of the trusted client devices to identify and communicate with another one of the trusted client devices that is within a communication distance of the one of the trusted client devices.

* * * * *